United States Patent [19]

Tsujino et al.

[11] Patent Number: 5,307,419
[45] Date of Patent: Apr. 26, 1994

[54] CONTROL DEVICE OF AN AUTONOMOUSLY MOVING BODY AND EVALUATION METHOD FOR DATA THEREOF

[75] Inventors: Hiroshi Tsujino, Iruma; Hiroshi Hasegawa, Niiza; Yoshiaki Sakagami, Kodaira; Hirokazu Yamashita, Asaka, all of Japan

[73] Assignee: Honda Giken Kogyo Kabushiki Kaisha, Tokyo, Japan

[21] Appl. No.: 801,708

[22] Filed: Dec. 2, 1991

[30] Foreign Application Priority Data

Nov. 30, 1990 [JP] Japan .................... 2-335731
Nov. 30, 1990 [JP] Japan .................... 2-335732

[51] Int. Cl.$^5$ .................................... G06K 9/00
[52] U.S. Cl. .......................... 382/1; 382/48; 395/88; 348/119
[58] Field of Search ............ 382/1, 48, 22, 14, 15; 358/103, 105; 701/1, 8, 46, 47; 395/80, 81, 88

[56] References Cited

U.S. PATENT DOCUMENTS

| | | | |
|---|---|---|---|
| 4,906,940 | 3/1990 | Greene et al. | 382/22 |
| 5,097,329 | 3/1992 | Hasegawa et al. | 358/103 |
| 5,109,425 | 4/1992 | Lawton | 382/1 |
| 5,122,957 | 6/1992 | Hattori | 382/1 |
| 5,142,659 | 8/1992 | Rao et al. | 382/1 |
| 5,144,685 | 9/1992 | Nasar et al. | 382/48 |

FOREIGN PATENT DOCUMENTS 0354561 2/1990 European Pat. Off. .

OTHER PUBLICATIONS

Fukui, "TV Image Processing to Determine the Position of a Robot Vehicle", *Pattern Rec.* vol. 14, No. 1-6, 1981, pp. 101-109.

Proceedings 1987 IEEE International Conference on Robotics and Automation Mar. 31-Apr. 3, 1987, Raleigh, N.C.

T. Goto et al., 'The CMU System for Mobile Robots Navigation' Proceedings 1987 IEEE International Conference on Robotics and Automation Apr. 24-29, Philadelphia, USA.

*Primary Examiner*—Joseph Mancuso
*Attorney, Agent, or Firm*—Lyon & Lyon

[57] ABSTRACT

A control device of an autonomously moving body according to the present invention comprises at least one image pickup unit which picks up the image of a moving road of an automatically moving body; an image processing unit which processes a plurality of image data outputted from the image pickup unit and detects and outputs the condition of said moving read, or an outside information obtaining unit which obtains environmental information other than image; a storage means which stores data outputted from said image processing unit or said outside information obtaining means; a data control section which corrects said data stored in said storage means to data of an arbitrary time and position; a data evaluating section which integrates a plurality of data outputted from said data control section into one moving road data; and a control section which controls the movement of the autonomously moving body according to the moving road data outputted from said data evaluating section.

5 Claims, 19 Drawing Sheets

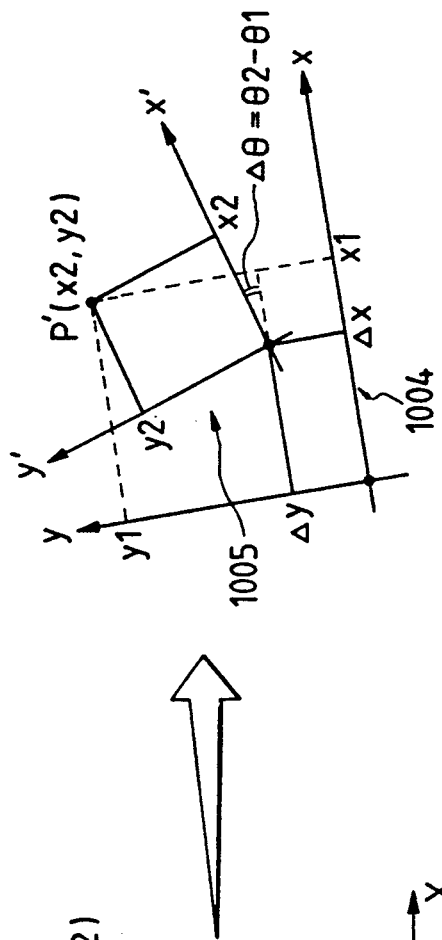
FIG. 10A
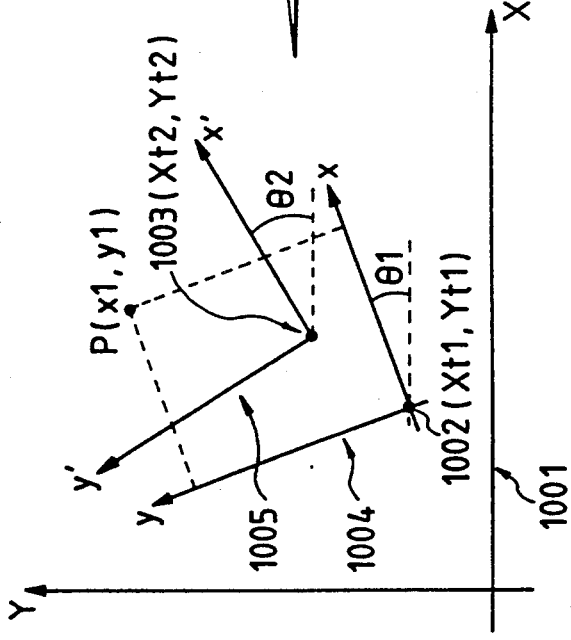
FIG. 10B
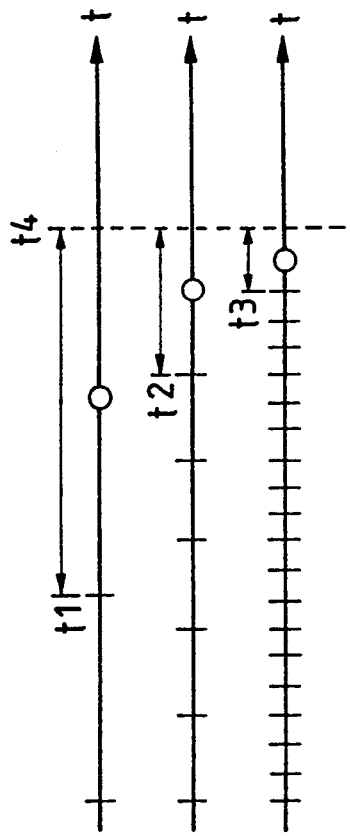
FIG. 11A
FIG. 11B
FIG. 11C

FIG. 16

| REGION EXTRACTION | | | |
|---|---|---|---|
| | NUMBER OF GROUPS (MAXIMUM 16) | | |
| LOCALL LINE SEGMENT TRACING | NUMBER OF SEQUENCES OF POINTS (MAXIMUM 30) | ATTRIBUTE OF LINE | |
| | x ( cm ) | y ( cm ) | |
| GENERAL LINE SEGMENT EXTRACTION | ATTRIBUTE OF POINT | . . . | |
| | NUMBER OF GROUPS IN THE OPPOSED RELA- TIONSHIP (MAXIMUM 7) | ID0 OF GROUPS IN THE OPPOSED RELATIONSHIP | GROUP 0 |
| | ID1 OF GROUPS IN THE OPPOSED RELATIONSHIP | . . . | |
| | NUMBER OF CONNECTING POINTS (MAXIMUM 5) | ID0 OF CONNECTING POINT | |
| | NUMBER OF GROUPS IN THE CONNECTING RELATIONSHIP | ID0 OF CONNECTING GROUP | |
| | ID1 OF CONNECTING GROUPS | . . . | |

GROUP 1

GROUP 15

IS THERE A SHADE OR NOT ? (1 OR 0)

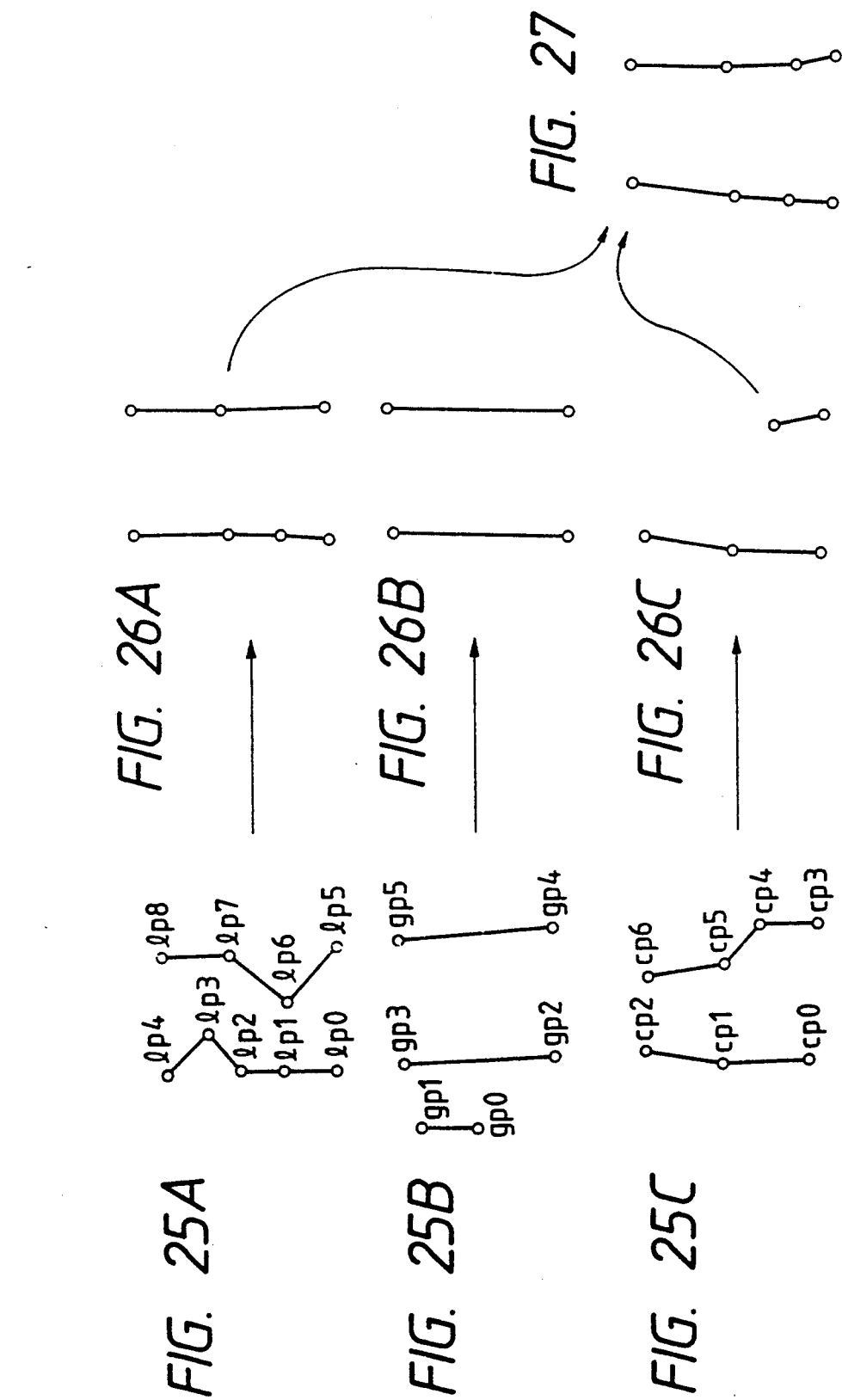

CONTROL DEVICE OF AN AUTONOMOUSLY MOVING BODY AND EVALUATION METHOD FOR DATA THEREOF

BACKGROUND OF THE INVENTION

1. Field of the Invention

The present invention relates to a control device to be used for controlling an autonomously moving body such as an autonomously running vehicle or robot and a method for evaluating data of the moving body obtained from an image processing systems by the control device.

2. Related Background Art

Conventionally, various running control devices have been proposed in order to automatically move an automobile or a robot in an autonomous manner. Running control of an autonomously running vehicle has been conventionally conducted by continuously picking up images of a front sight by a camera mounted on the vehicle body; and a running course is recognized according to the inputted image. However, the reliability of techniques which identify a running course based only on image data obtained from one camera, is rather low. Therefore, in order to improve the reliability of obtained road data, attempts have been made to stably control autonomous running by inputting road images from a plurality of cameras and detecting running conditions by a plurality of sensors.

However, in order to control running and movement while the body is moving, the manner of evaluating a plurality of images and data obtained from a plurality of sensors for a problem. That is, because each set of data is obtained at a different time and position, it is difficult to evaluate the data at the same time. Further, no technique has been established for uniformly processing the recognized data.

SUMMARY OF THE INVENTION

An object of the present invention is to increase the reliability of data which is obtained by a control device and to provide an evaluation method which may be used to evaluate data at a given point in time.

The present invention has been achieved in order to solve the aforementioned problems The present invention provides a control device for an autonomously moving body comprising: at least one image pickup unit which picks up an image of a moving road of an autonomously moving body is moving; an image processing unit which processes a plurality of image data outputted from the image pickup unit, and detects and outputs a condition of said road, or an outside information obtaining unit which obtains information other than image data; a storage means which stores data outputted from said image processing unit or said outside information obtaining means; a data control section which corrects said data stored in said storage means to data of an arbitrary time and position; a data evaluating section which integrates a plurality of data outputted from said data control section into one set of road data; and a control section which controls the movement of the autonomously moving body according to the road data outputted from said data evaluating section.

Data inputted and stored in the past is evaluated by being corrected to a desired time. Consequently, image data which was inputted into a plurality of image pickup units and obtained at different processing times, can be uniformly evaluated at the same point in time.

The evaluation method according to the present invention has been achieved in order to solve the above described conventional problems, and to provide an evaluation method for a vehicle moving on a road, characterized in that: a plurality of sequences of data points extracted from the vehicle moving road data, the image of which was taken by an image pickup device, the sequences of points are inputted and corrected such that data obtained at a given point in time is held structured to the level of lines and points, and the conditions of the lines and points comprising the road data are described as a model; likeness of the aforementioned sequence of points data to a predetermined road is judged by a predetermined rule in which a model is used as a verification reference; and the aforementioned inputted sequence of points data is transformed into one appropriate set of road data according to the result of the judgment.

The evaluation is conducted not on a line segment level but on a dot level, and thus, a complicated shape of road can be recognized. Likeness to a predetermined road is judged according to the sequence of points data sent from a plurality of image pickup devices, so that the reliability of data obtained can be improved.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Figure 6:
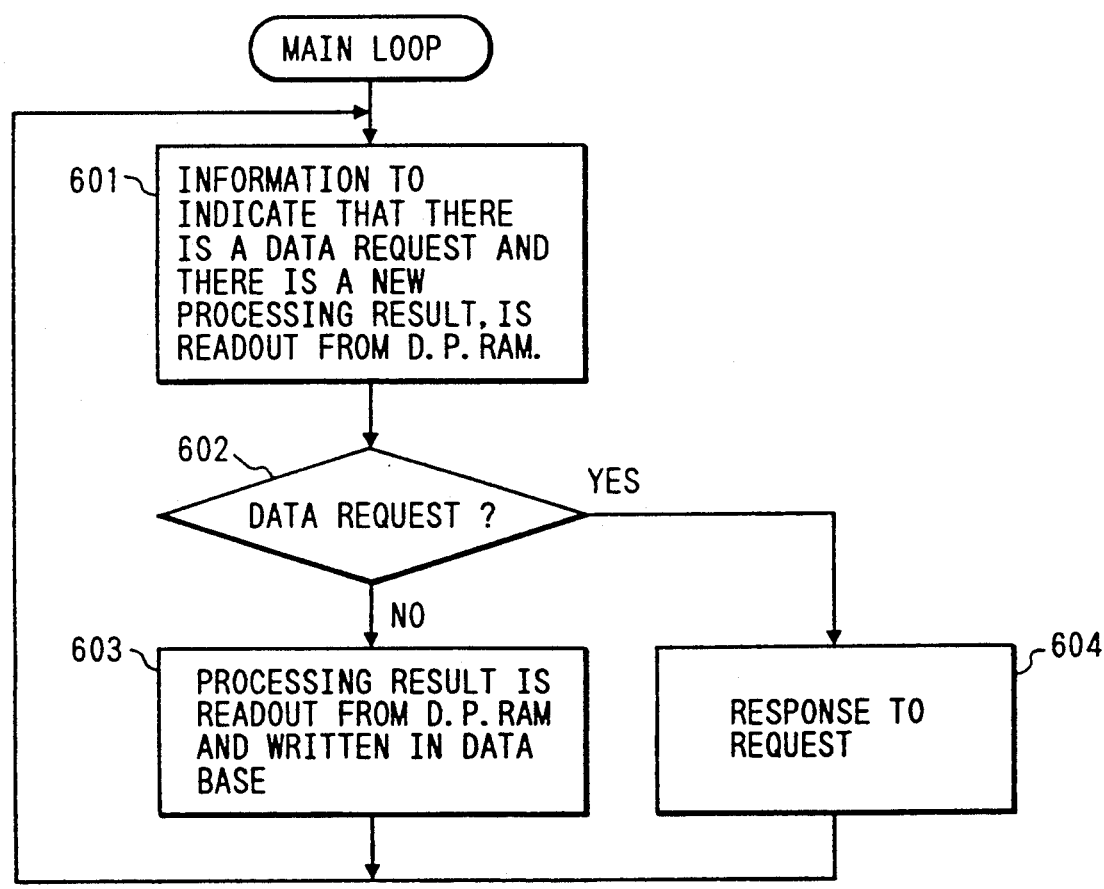
Figure 7:
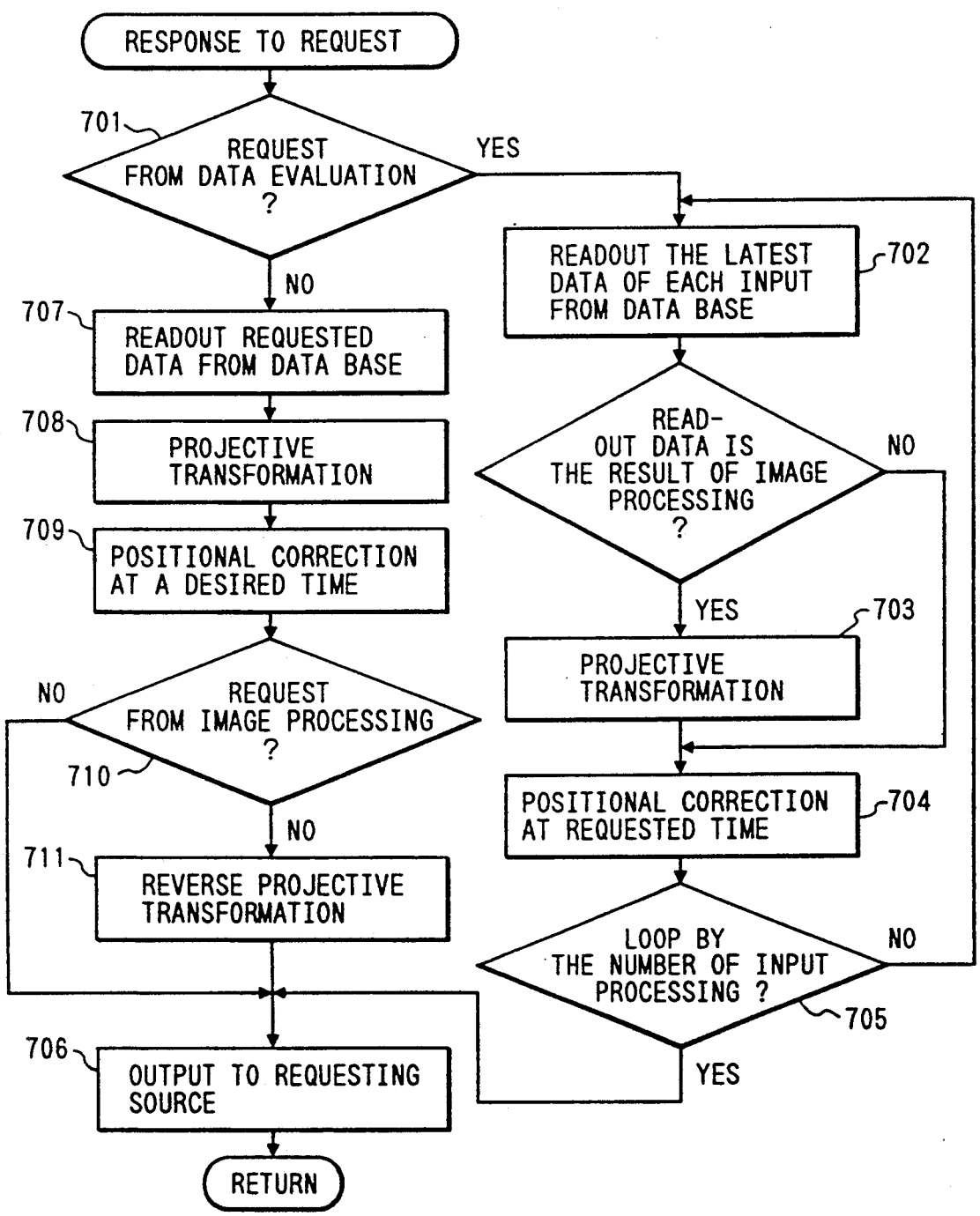
Figure 8:
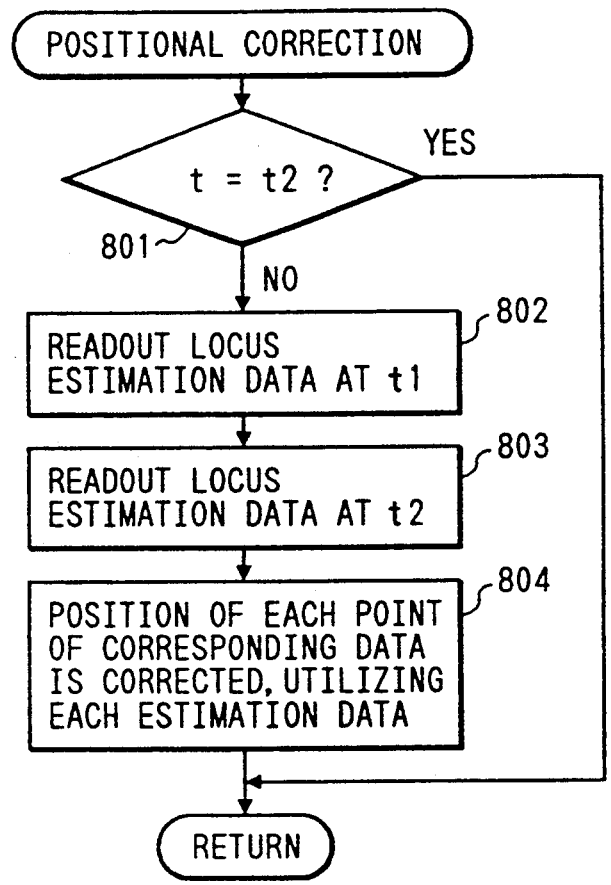
Figure 9:
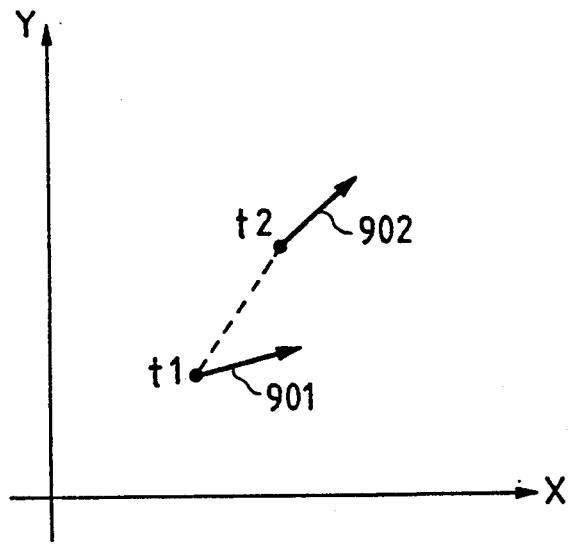
Figure 13:
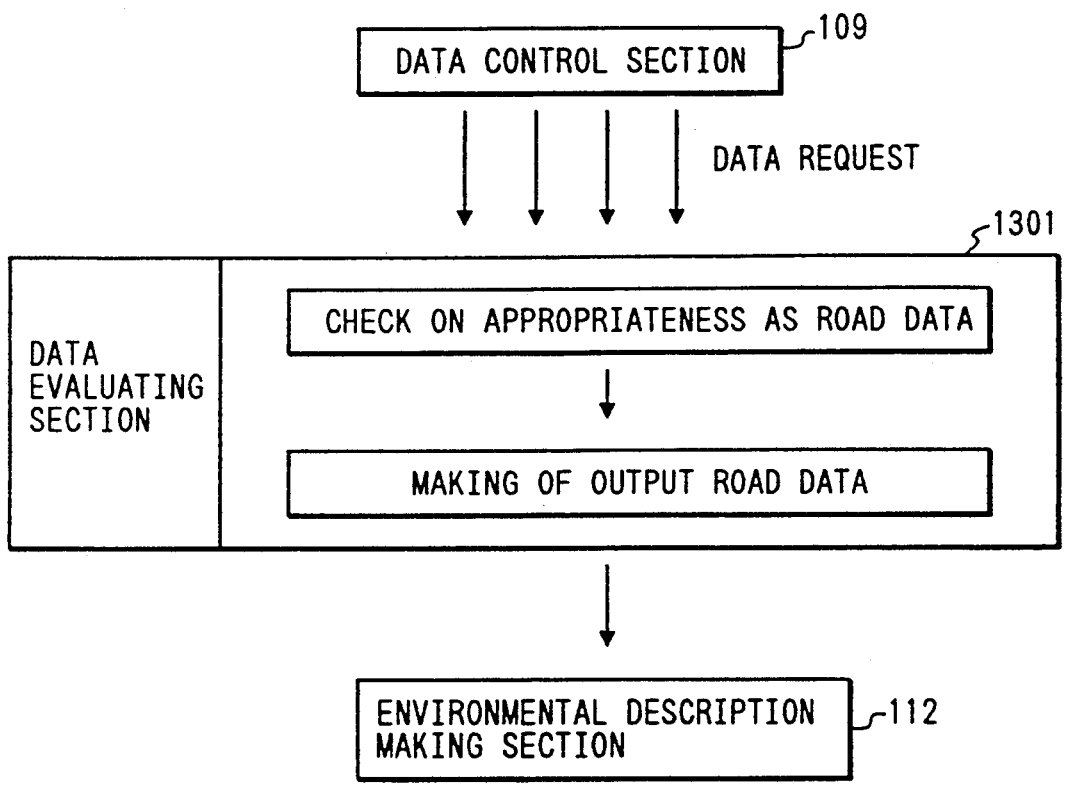
Figure 14:
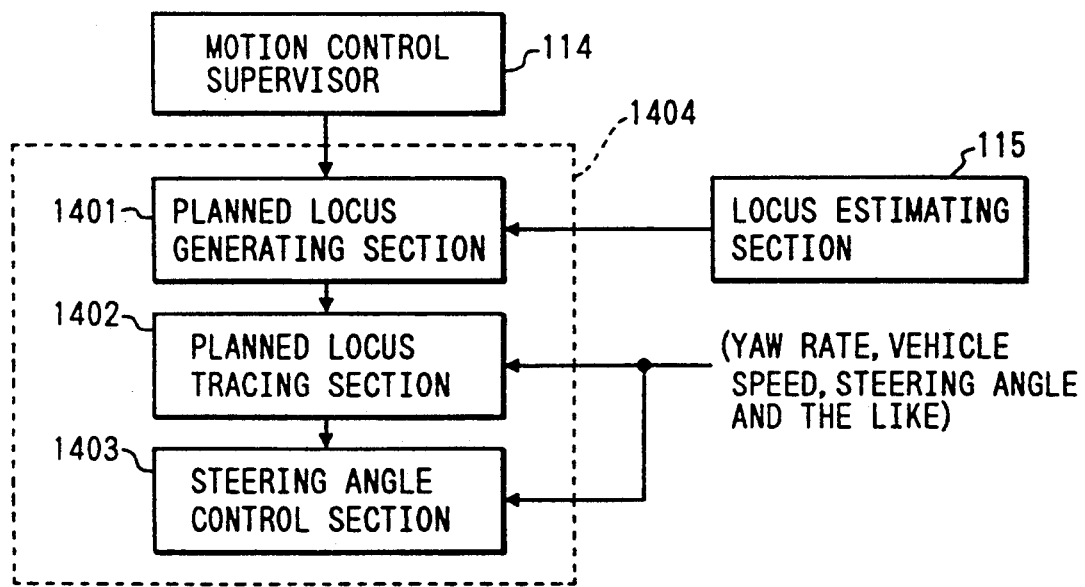
Figure 15:
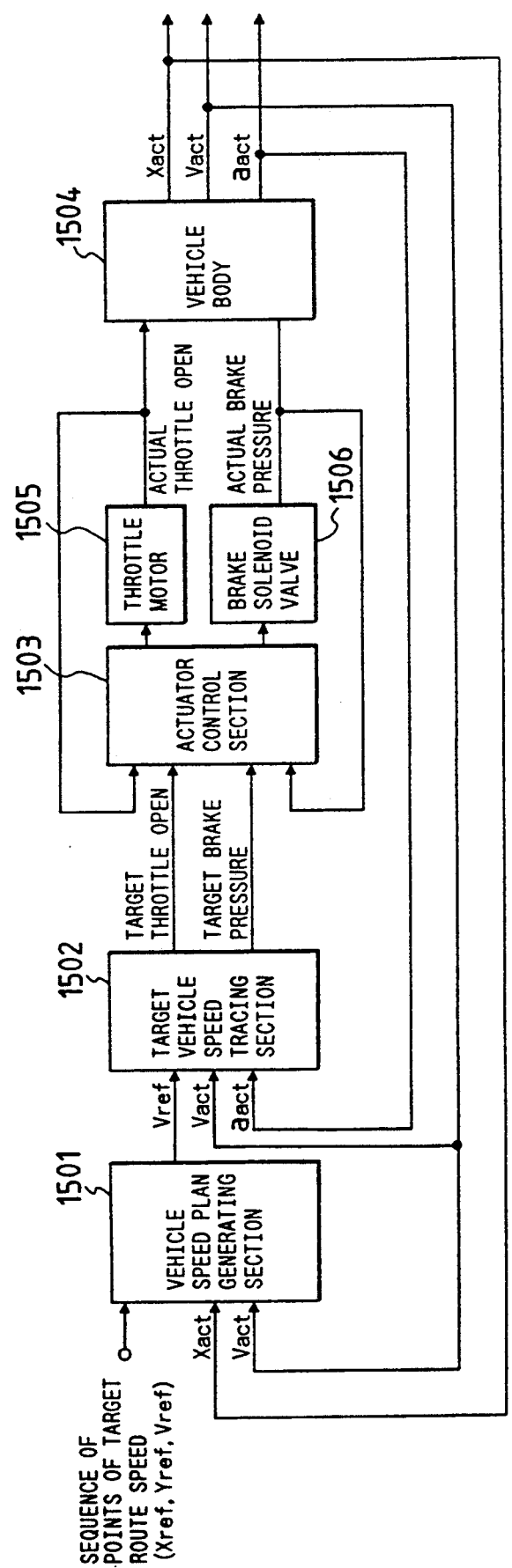
Figure 17:
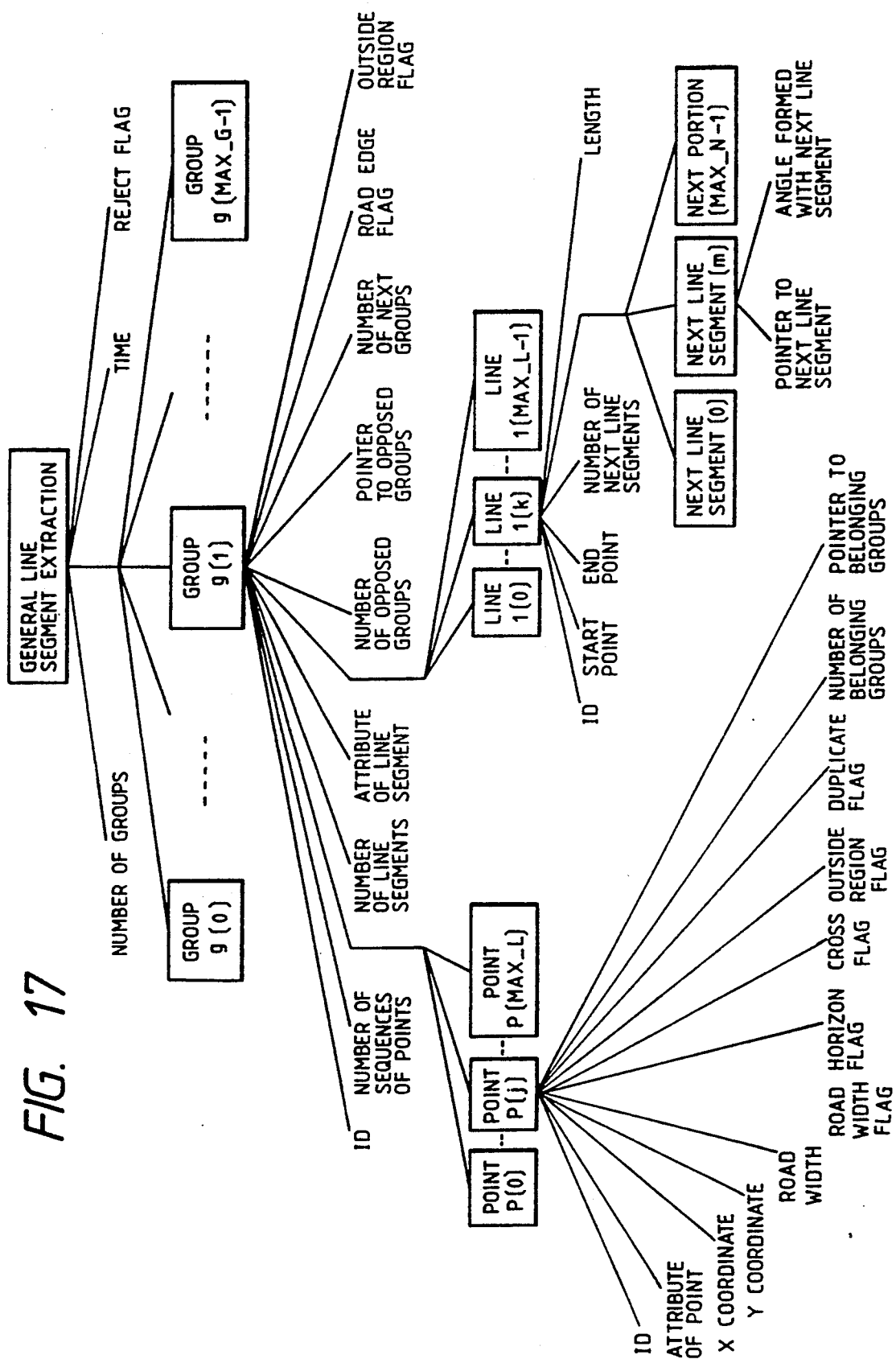
Figure 18:
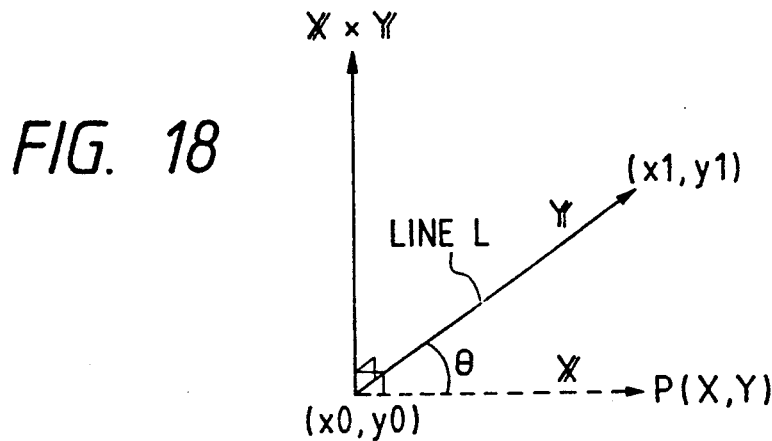
Figure 19:
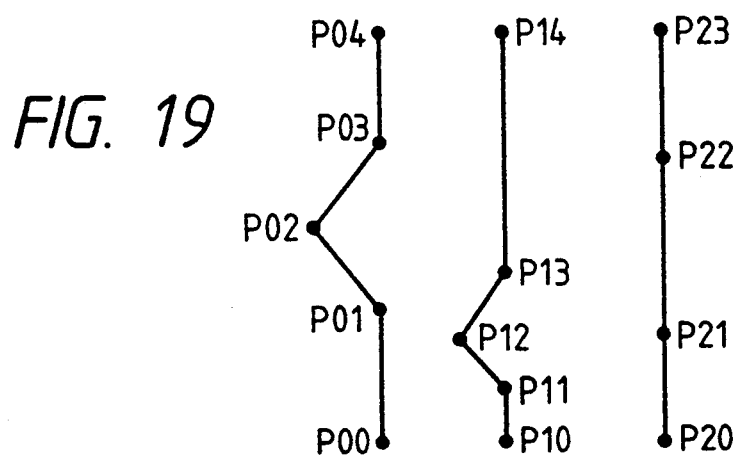
Figure 20:
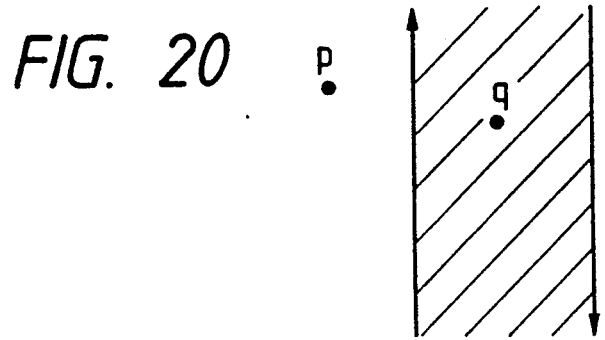
Figure 21:
Figure 22:
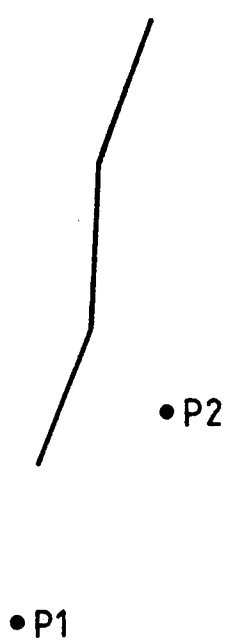
Figure 23:
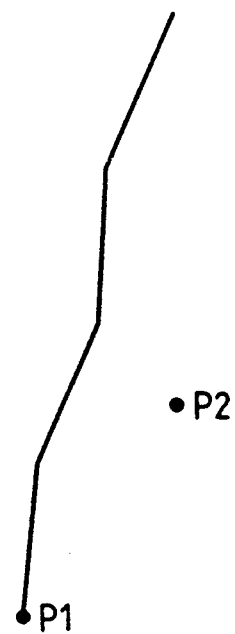
Figure 24:
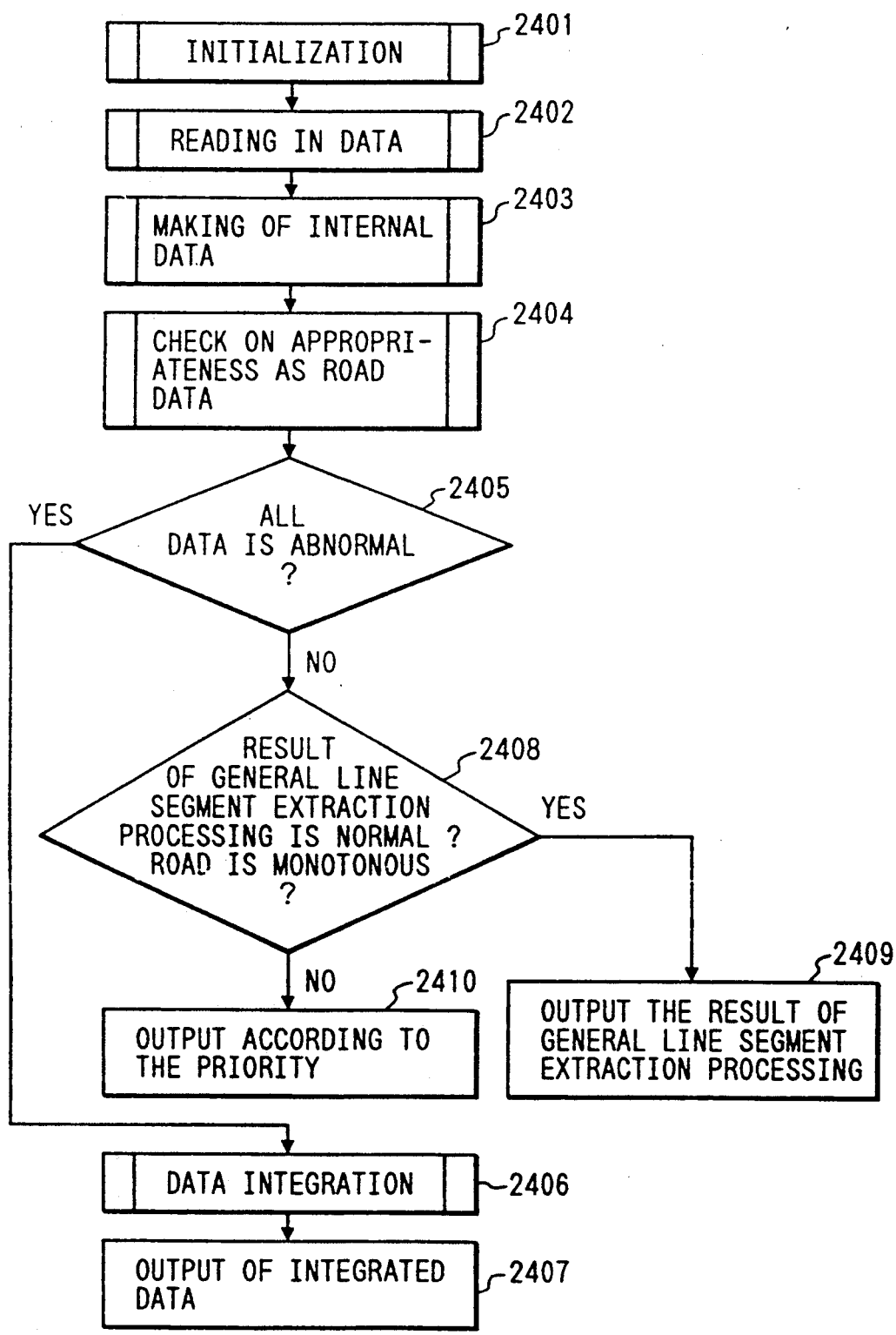

Each of FIG. 6, FIG. 7 and, FIG. 8, is a flow chart showing the flow of processing of the data control section;

FIG. 9 is a graph showing the position and direction of a vehicle body which is used for the explanation of the flow chart shown in FIG. 8;

FIGS. 10A and 10B are graphs to explain positional correction processing conducted in the data control section;

FIGS. 11A, 11B and 11C are views to explain the time relation between the image processings in the positional correction;

FIGS. 12A, 12B, 12C and 12D are views to explain an input image at each time in this positional correction;

FIG. 13 is a block diagram showing the flow of processing in the data evaluating section;

FIG. 14 is a block diagram showing the structure of the locus control section; and FIG. 15 is a block diagram showing the structure of the vehicle speed control section;

FIG. 16 is a view showing the structure of data inputted into the data evaluating section;

FIG. 17 is a view showing the structure of data in the data evaluating section;

FIG. 18 is a graph to explain the calculation of road width in which the outer product of a vector is used;

FIG. 19 is a view showing an example of road data to which the road width calculation utilizing the outer product of a vector is applied;

FIG. 20 is a view to explain judgment to judge whether or not a point is inside or outside of a region;

FIG. 21 is a view to explain a condition under which a point is smoothly connected with a line segment;

FIG. 22 is a view showing an example of data before conducting integration processing of different kinds of data;

FIG. 23 is a view showing an example of data after conducting integration processing of different kinds of data;

FIG. 24 is a flow chart showing the outline of processing conducted in the data, evaluating section;

FIGS. 25A, 25B and 25C are views showing examples of data inputted into the data evaluating section from each image processing device;

FIGS. 26A, 26B and 26C are views showing data judged appropriate by the data evaluating section among data shown in FIG. 25;

FIG. 27 is a view showing data outputted from the data evaluating section after the data shown in FIG. 26 has been integrated; and Each of FIG. 28, FIG. 29, FIG. 30, FIG. 31, FIG. 32 and FIG. 33 is an example of experimental data showing the process of data processing conducted in the data evaluating section.

DESCRIPTION OF THE PREFERRED EMBODIMENT

A vehicle control system according to one embodiment of the present invention comprises an image processing section, a navigation system section, a data control section, a data evaluating section, an environmental description making section, a motion control supervisor, a locus estimating section, and a driving control section.

The image processing section includes at least one image pickup device, an outside information obtaining means to obtain outside information other than images, and an image processing device in which a plurality of image processing techniques are used. In general, a plurality of standard focal distance image pickup devices, telephoto image pickup devices, color image pickup devices, infrared image pickup devices, or super sensitive image pickup devices are used to compose at least one image pickup device, however in the embodiment shown in FIG. 1, a color camera 101 and a monochromatic camera 102 are used for the image pickup device. Radar systems, ultrasonic sensors and the like are used for the outside information obtaining means to obtain outside information other than images, however, in the embodiment, only a radar system 103 is utilized. This radar system is used to detect an obstacle which is located in a position far in front of a driving vehicle. Further, information about the number and position of the obstacle can be obtained by the radar system. The obtained obstacle information is outputted to the data control section 109.

Also image processing in the image processing device is conducted for the purpose of extracting road data. The image processing means comprises a region extracting means, a local line segment tracing means, a general line segment extracting means, a stereoscopic means, and a moving image processing means. In this embodiment, image information inputted from the color camera 101 is processed using the region extracting means 104 and a road region is extracted based on color images. The extracted road region boundary data and positional data are outputted to the data control section 109.

Image information inputted from the monochrome camera 102 is processed by the local line segment tracing means 105 and the general line segment extracting means 106. The local line segment tracing means 105 extracts small area of road edges which have been obtained by processing a monochromatic image. The extracted local line segment data is outputted into the data control section 109. The general line segment extracting means 106 approximates and generally estimates the location of the road edges to obtain guidelines. The main line segments obtained are outputted to the data control section 109.

The navigation system 107 is provided with an interface to communicate with a user (human being) 108, such that a general running schedule may be made and provided to the system. At present, the general driving schedule includes, for example, destination information, etc., and is inputted into the navigation system 107 by the user 108. Based on information stored therein, the navigation system 107 outputs global map information such as a general route and corresponding peripheral map information, a route instruction, and a legal speed limit, to the environmental description making section 112 and motion control supervisor 114. Also the user 108 can command the motion control supervisor 114 to change over the driving mode.

Various image processing data sets are inputted into the data control section 109 from the image processing device, and information defining obstacles is inputted from the radar system 103. Environmental description data at an arbitrary time is inputted into the data control section 109 from the environmental description making section 112. The data control section 109 stores the inputted data in a data base (DB) 110 and the inputted data is used to control the result of image processing and the time of obstacle information detected by the radar. Road edge data on an image pickup surface which has been obtained by an image pickup device installed diagonally with regard to a road surface and processed by the image processing device, is projectively transformed and projected on a two dimensional road surface. The coordinates of the data are transformed into a coordinate system of a past arbitrary time according to the time accompanying the data and an estimated locus table is calculated by the locus estimating section 115. A candidate region is passed on to the region extracting means 104 so that a search starting point and searching direction may be passed on to the local line segment tracing means 105 and a candidate line segment is passed on to the general line segment extracting means 106.

Image processing data having synchronous time and coordinate valves, is inputted into the data evaluating section 111 from the data controlling section 109. Environmental description data at an arbitrary time is inputted into the data evaluating section 111 from the environmental description making section 112. Incorrect data is eliminated by comparing a plurality of two dimensional road data sets, transformed to the same time coordinates, with respect to their conformity with the road model and compatibility between each road data. A plurality of data sets which have been judged to be appropriate as road data, are integrated into one datum. Integrated road data resulting from the data evaluation are outputted into the data control section 109 and the environment describing section 112.

The environmental description making section 112 integrally holds results of recognized obstacle information or the like to describe the environment in which the vehicle is situated. That is to say, the road data inputted from the data evaluating section 111 is expressed by means of a vector, and held and controlled by the environmental data base 113. Also, inputted road data is superimposed on the environmental description previously held, to determine and eliminate an attribute of each line segment in the data according to connecting relation with past data and relative position etc. with regard to the vehicle.

The motion control supervisor 114 generates a movement plan for the autonomously driving vehicle and instructs its movement. That is, by a man-machine interface between the motion control supervisor 114 and the driver (the user 108), changeover is conducted between automatic and manual driving, and between start and stop of driving. Necessary judgments to evade an obstacle and select a traffic lane are conducted according to the environmental description data sent from the environmental description making section 112, guiding information from the navigation system 107, movement amount of the vehicle from the locus estimating section 115, and vehicle speed information sent from the vehicle speed control section 117, to prepare a route plan. A speed plan composed of a driving speed and a specified distance at which the vehicle speed should reach said driving speed, is made according to the visual field distance of an image, the, vehicle speed, the time needed for recognizing the environment, and the legal speed obtained from the navigation system 107. Further, on the basis of the route plan and the speed plan, movement is instructed by matching control sections (the locus control section 116 and the vehicle speed control section 117). This movement plan is outputted into the environmental description making section 112. The determined route is outputted to the locus control section 116, and the instructed speed is outputted to the vehicle speed control section 117.

Information from a vehicle speed sensor 118 and a yaw rate sensor 120 is inputted into the locus estimating section 115, and a locus of the vehicle body on a coordinate is calculated from the movement of the vehicle body. When the time and coordinate are written in a shared-memory, the locus control section 116 functions as a reference clock of the system. According to the calculated result of the locus, the movement amount of the vehicle is found, which is outputted to the data control section 109, the environmental description making section 112, and the motion control supervisor 114.

The driving control section is composed of the locus control section 116 and the vehicle speed control section 117. Sensor information is inputted to the locus control section 116 from the vehicle sensor 118, the steering angle sensor 119, and the yaw rate sensor 120. The locus control section 116 is provided with a steering angle control means which can control at least one of the front and rear wheels. Sensor information sent from the vehicle speed sensor 118 and an acceleration sensor 121 is inputted to the vehicle speed control section 117. The vehicle speed control section 117 is provided with a means to control engine output and brake force by an opening of an accelerator and brake pressure. Vehicle speed information is outputted to the motion control supervisor 114.

Next, the main devices which comprise the control section of an autonomously driving vehicle, will be described in detail as follows.

First, a color camera 101 and monochromatic camera 102 will be explained. Since an image pickup device has to be installed on a vehicle, it is desirable that one set of cameras be shared among a plurality of processings. However, since various natural images are processed by the system and the vehicle speed is varied, it is preferable that a plurality of image input means are provided to suit various circumstances. For example, a telephotographic camera and wide angle camera may be utilized when a visual field can be covered in such a manner that both cameras compensate with each other In the case of driving at night, an infrared camera is suitable as it can detect the difference in temperature between a road and a road shoulder. Further, infrared cameras generally are not effected by light from a vehicle running in the opposite lane. Where a stereoscopic vision is used to find the distance from a foregoing vehicle, more than two cameras are necessary. Therefore, in this embodiment, two kinds of image pickup devices (the color camera 101 and the monochromatic camera 102) are utilized, and further a radar system 103 is employed to secure information appropriate for various circumstances.

Next, the region extracting means 104 will be explained. In the case of a road on which a definite boundary such as a white line is not drawn, and which is composed of asphalt, mud and weeds, extracting a line segment becomes extremely unstable. In the case of the aforementioned road, extracting a region by color characteristics is effective (Lightness I, Saturation S, Hue H). Therefore, in this embodiment, a color camera 101 is adopted as one of the image pickup devices so that the road region is extracted by the road extracting means 104 in accordance with the characteristic of colors. The extraction of the road region described above is conducted on the assumption that the area immediately in front of the vehicle is a road region, and a portion of the image having color characteristics similar to that of the road region is extracted. It is also possible to extract a road region at night by a technique essentially the same as the aforementioned extracting process, utilizing an infrared camera to judge temperature of a road from an infrared image at night.

High reliability of the region extraction processing can be attained by comparing the present data with the result previously obtained until the last occasion, utilizing environmental description sent from the environmental description making section 112. By the extraction processing of the aforementioned region, a rough contour of the road (the region in which the vehicle can travel) can be obtained. The aforementioned processing is important not only in the case where a definite boundary can not be obtained, but also as a foundation for the segment extracting processing in the local line segment tracing means 105 and the general line segment extracting means 106 to not mistakenly take a guard rail and wall for a road.

Next, the general line segment extracting means 106 will be explained. The line segment extracting means 106 is capable of processing a broad area in an image where the road structure is simple, for example, in the case of a straight highway. For example, a region in which a road is assumed to exist from the setting angle of a TV camera, Hough-Transformation which is an excellent straight line detection means is applied. Even when the region is not wide enough to cover the entire road, a boundary can be extracted if the road is straight. Further, because it suffices to apply Hough-Transformation only once, the boundary can be extracted with extremely high speed. In general, Hough-Transformation is considered to require a large amount of time. However, the applicant has made it possible to conduct high speed Hough-Transformation with a speed close to a video rate by high speed Hough Transformation hardware, which has been disclosed in a previous application. According to the general line segment extracting processing of this embodiment, the data of the main road boundary line segment, which is the same as the data obtained when the road is viewed generally, can be received and utilized for road region extraction processing, to extract a highly reliable road region.

Next, the local line segment tracing means 105 will be explained. When an intersection, or a complicated branch or a sharp curve is recognized, a detailed and local tracing of road boundary becomes necessary. Although there is a method whereby a boundary can be searched successively at each pixel, it seems to be more effective in case of a natural environment to trace the road boundary utilizing a small region from which the road boundary can be detected with the Hough-Transformation method. By the local segment tracing processing described above, a precise road boundary line segment necessary to travel on a road having a complicated structure can be outputted. By receiving initial data such as search starting point and searching direction, when the processing results of the aforementioned general line segment extraction and region extraction is utilized, reliability can be improved and processing time can be reduced.

Next, the data control section 109 will be explained. In an autonomously driving vehicle, it is very advantageous to have a plurality of image processing means as well as distance information obtaining means such as the radar system 103 in order to recognize various environments. However, the time to execute each processing is not the same and becomes varied according to circumstances. Therefore, in this embodiment, it is possible to judge and process each processing set at the same time using the data control section 109.

Figure 2:
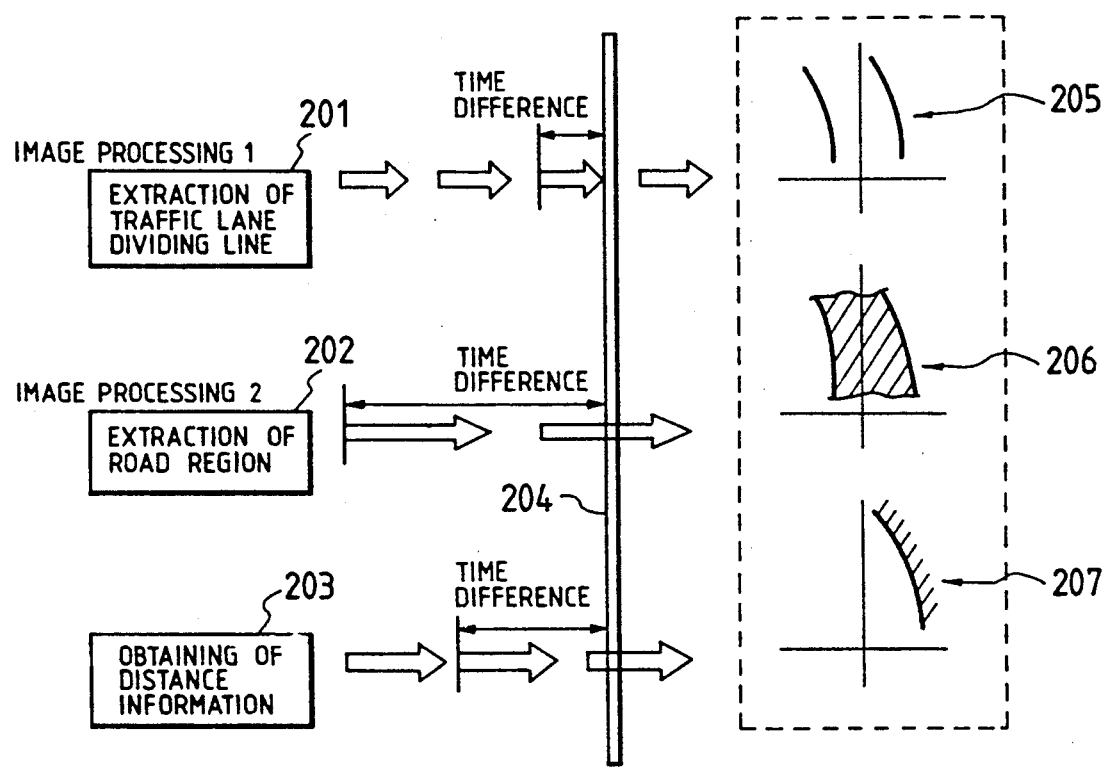
FIG. 2 is a view to explain the outline of one function of the data control section of the embodiment.

For example, turning now to FIG. 2, in the general line segment extracting means 106, a traffic lane dividing line extraction processing 201 is executed as one image processing. Also, in the region extracting means 104, a road region extracting processing 202 is executed as another image processing. In the radar system 103, a distance information obtaining processing 203 is executed. Processing time of each processing is represented by the length of an arrow illustrated in the drawing. However, et a point of time indicated by a straight line 204, the third time processing of the traffic lane line extracting processing 201 has just been completed. Also the road region extracting processing 202 has completed the first processing, and the second processing is in the middle of being conducted. The distance information obtaining means 203 has completed the processing twice, and the third processing is in the middle of being conducted.

As described above, the time to execute each processing is not the same and becomes varied depending on a given set of circumstances. The data control section 109 executes a coordinate transformation whereby the result of each processing can be uniformly treated on the coordinate at the same time. In other words, the data control section 109 can be treated as an independent module provided with a function to obtain the time and movement amount of a vehicle from a reference clock and a locus estimating section which measures the vehicle position of every changing moment; and according to the time and movement amount obtained, to transform the aforementioned results of processing conducted non synchronously onto an arbitrary coordinate. As a result, when the processing results obtained at a time indicated by a straight line 204 shown in the drawing are transformed by the data control section 109, the processing results transformed into the same time and same coordinates are obtained. That is, the road segment 205 obtained by the traffic lane dividing line segment extracting processing 201, the road region 206 obtained by the road region extracting processing 202, and the distance information 207 obtained by the distance information obtaining processing 203, can be transformed into the same time and same coordinate.

The independent module mentioned above is effective in cases where a plurality of image processing means to recognize a road on which an autonomous vehicle travels. Also, a distance information obtaining means such as the radar system 103 is provided as shown in this embodiment. Through the above-mentioned functionality, the following advantages can be obtained. First, the result of each processing executed non-synchronously and in parallel can be effectively transformed into the same time and onto the same coordinates. Secondly, the same processing such as a coordinate transformation can be unified. Thirdly, the load in image processing and distance information detection processing, and the load in communication and arithmetic processing at the stage of total evaluation conducted later can be reduced. Fourthly, communication among processings can be simplified.

Figure 3:
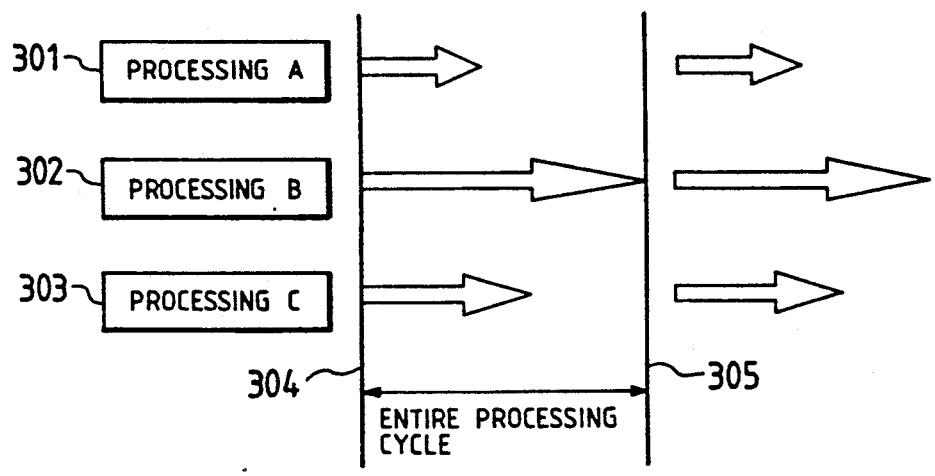
FIG. 3 is a view to explain inconvenience caused when the data control section is not used.

For example, in order to evaluate a plurality of processing results integrated into the same time and coordinate, all the processings may be started at the same time, and the inputted image and distance data may be processed at the same point. That is, when a plurality of processings, such as processing A301, processing B302, and processing C303, are synchronously operated as shown in FIG. 3, the processings 301-303 are started by means of communication at the same time indicated by a straight line 304 and it suffices that the inputted image and distance data may be processed at the time indicated by the straight line 305. In this case, the interval between the straight lines 304 and 305 becomes the total processing cycle.

However, according to the aforementioned method, all processing cycles are restricted by the longest processing time, therefore a close communication of processing times between the operations becomes necessary in order to align the starting time. In the example shown in FIG. 3, all processing cycles are restricted by the processing time of processing B302. According to the data control section 109 in this embodiment, by adding the image input time to the result of each processing, all processings can be conducted individually thereafter. For example, if a road not far off can be recognized by a short processing cycle, even when it takes some time to recognize a road far off, the vehicle can be driven at a high speed when both processings are -executed in parallel.

In the case of an autonomous vehicle having a plurality of image processing means and distance information obtaining means such as a radar system 103, the reliability of recognition can be greatly improved when the results of driving road recognition previously obtained and the results of previous processing are referred to and utilized. However, the time to execute each processing is not the same as that described above, it varies depending upon circumstances. Also, in some cases, the coordinate systems to be used are different. Therefore, where each processing directly exchanges the data so that the time and coordinate are transformed, communication and calculation will take a long period of time, which becomes a heavy processing load. The data control section 109 in this embodiment realizes a processing technique in which information required by each processing in the aforementioned system can be effectively exchanged.

That is, the data control section 109 as described above, is an independent module having the function to obtain the time and movement amount of the vehicle from the locus estimating section which is provided with a reference clock and a means to measure the movement amount of the vehicle of every changing moment and according to the obtained result, to transform the driving road recognition results and other processing results required in the aforementioned processing carried out non-synchronously, onto an arbitrary coordinate of an arbitrary time.

Figure 4:
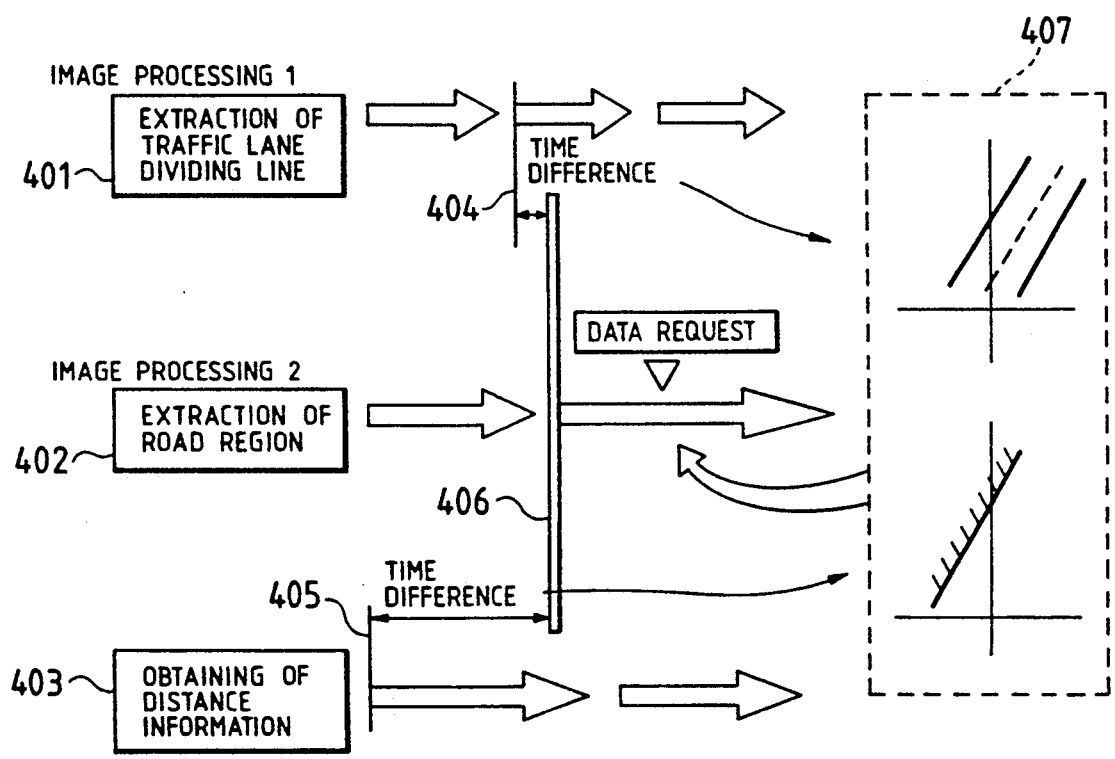
FIG. 4 is a view to explain another function of the data control section of the embodiment.

For example, the foregoing will be explained as follows, referring to FIG. 4. Now, a traffic lane dividing line extracting processing 401, a road region extracting processing 402, and a distance information obtaining processing 403 are executed in parallel. The processings 401-403 are performed utilizing and referring to the processing results with each other by the time and position correcting function of the data control section 109. The length of an arrow in the drawing represents the period of time necessary for conducting processing for one time. Assume that: in the road region extracting processing 402, a data request is made to the traffic lane dividing line extracting processing 401 and the distance information obtaining processing 403 at a time marked --. The latest processing result which has been processed immediately before the requested time is outputted to the traffic lane dividing line extracting processing 401. The input time of the image which is an object of the aforementioned processing, is represented by a point of time at a straight line 404 in the drawing. In the same manner, the distance information obtaining processing 403 outputs the latest processing result which has been processed immediately before the requested time. The time at which the input date of this processing is obtained, is represented by a point of time et a straight line 405 in the drawing. In the road region extracting processing 402 which has made the request, the time, of input of the image to be processed is represented by a point of time at a straight line 406 in the drawing.

The data control section 109 to which the processing results outputted from each processing are inputted corrects the time and position when input was performed to the time when the processing which made the data request obtained its own input data and the estimated position of the vehicle at that time. That is, the processing results outputted from the traffic lane dividing line extracting processing 401 and the road region extracting process 402, outputted with a difference in time between the time at which one data request processing obtains input data and the time at which another data request processing obtains input data, are corrected according to the movement amount of the vehicle during that period. In the same manner, the processing result outputted from the distance information obtaining processing 403, is outputted, with the same time difference being corrected to the time when input data was obtained time of the input data requesting processing on the basis of the movement amount of the vehicle. As a result, the traffic lane dividing line and distance information data 407, which have been transformed into an integrated time and coordinate system are obtained.

As explained above, the data control section 109 conducts a time-adjustment of each processing data set according to the movement amount of the vehicle, and makes it possible to utilize past driving road recognition result and mutual processing results. That is, using data control section 109, the result of each processing which is conducted in parallel, is sorted and stored by the module, and further the data of an arbitrary time end style can be calculated as requested. By this function, the following advantages can be provided. First, a time and coordinate transformation can be effectively conducted, complying with various requests from a plurality of processings. Secondly, the same processing such as a coordinate transformation can be unified. Thirdly, the load in each processing such as communication and calculation time can be reduced. As a result, the communication and calculation time of the control unit can be greatly reduced, resulting in an increase of the processing speed of the total processing cycle.

Figure 5:
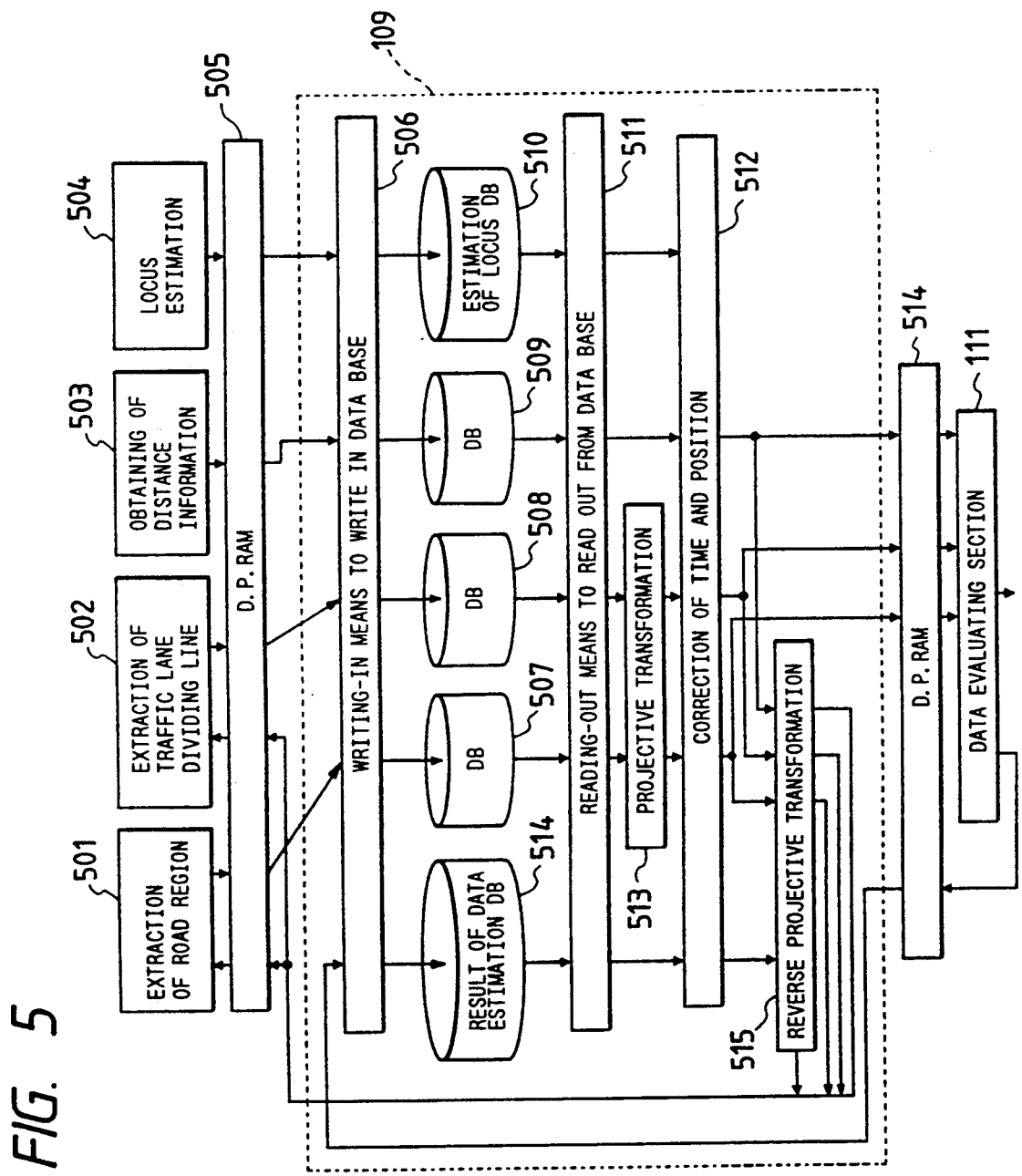
FIG. 5 is a block diagram showing the internal structure of the data control section of the embodiment.

Next, the structure of the data control section 109 will be explained referring to FIG. 5. In order to integrally control the processing results of a Plurality of image processing means and the distance information obtaining means such as the radar system 103 and to effectively perform function of transforming the processing results into data of an arbitrary time on the same coordinate, the data control section 109 is structured as shown in FIG. 5.

Figure 1:
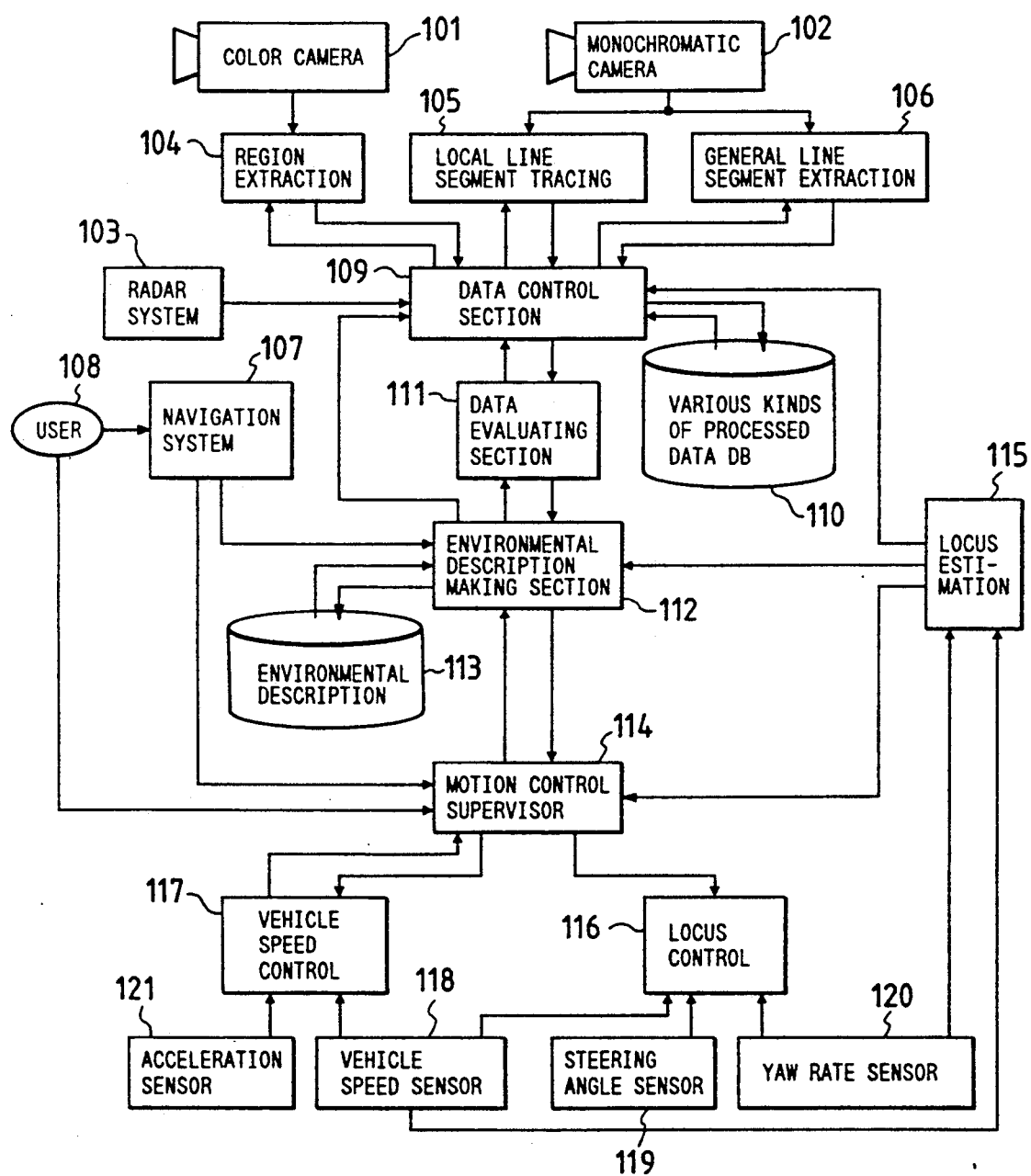
FIG. 1 is a block diagram showing the entire structure of the running control unit of an autonomously running vehicle of an embodiment according to the present invention.

A road region extracting means 501 corresponds to the region extracting means 104 shown in FIG. 1 and utilizes color information sent from the color camera 101. A traffic lane dividing line extracting means 502 corresponds to the local segment tracing means 105 and the general segment extracting means 106 which both utilize image information sent from the monochromatic camera 102. A distance information obtaining means 503 corresponds to the radar system 103, and a locus estimating section 504 corresponds to the locus estimating section 115 in FIG. 1. Image data and distance information outputted from the road region extracting means 501, the traffic lane line extracting means 502 and the distance information obtaining means 503, and movement data of the vehicle outputted from the locus estimating section 504, are non-synchronously written in Dual Port RAM (D. P. RAM) 505. The data evaluation result, (not shown in the drawing,) outputted from the environmental description section 112, is also stored in the environmental description of DPRAM 505.

The data control section 109 periodically reads this DPRAM 505, and when new data is found, the data is stored in the data base (DB) 507-10 corresponding to each means. This storing operation is executed by a data base writing means 506. Data outputted from the road region extracting means 501 is stored in DB 507 by the writing means 506, data outputted from the traffic lane dividing line extracting means 502 is stored in DB 508, data outputted from the distance information obtaining means 503 is stored in DB 509, and data outputted from the locus estimating section 504 is stored in DB 510.

When a request for some data is made by another means, the data control section 109 searches the requested data in DB 507-DB 510, and reads out said data with a reading means 511. The read-out data is transformed into a time and position coordinate requested, by time and position correction means 512. At this time, a correction processing is executed, using locus estimating data outputted from the locus estimating section 504 as a parameter. Data outputted from the road region extracting means 501 and the traffic lane dividing line extracting means 502 is transformed into a coordinate on an actual road by projective transformation means 513 to correct time and position.

Thereafter, road image information which has been projectively transformed, and distance information sent from the radar system 103, are outputted from a time and position correction means 512 into DPRAM 513, and transmitted to the date evaluating section 111. Also the result of the data evaluation outputted from the data evaluating section 111 is returned to this DPRAM 513, and stored into DP 514 by the data base writing means 506. Incidentally, DB 507-510 and DB 514 correspond to the data base 110 shown in FIG. 1. Information outputted from the time and position correction means is given to a reverse projective transformation means 515 together with the data evaluation result outputted from the data evaluating section 111. The information is then transformed into positional coordinates on a memory for image processing. Further, the transformed positional coordinate information is given to DPRAM 505 for input use, to be used for processing in the road region extracting means 501 and the traffic lane line extracting means 502.

Next, the processing conducted in the data control section 109 will be explained in detail, referring to a flow chart.

First, the main loop processing will be explained referring to FIG. 6. In order to find whether or not there is a new result outputted from the means 501-504 and whether or not there is a data request, the data control section 109 periodically reads out from DPRAM 505 information indicating the above (step 601). The read out information is evaluated to determine whether it is a data request or a newly outputted result (step 602). When the result is judged not to be a data request, the result of each processing is read out from DPRAM 505 and written in DB 507-510 (step 603). After that, the process is returned to step 601, to repeatedly execute the aforementioned processing. When the judgement result in step 602 is a data request, necessary data is read out from one of DB 507-510, and request response processing described later, is executed (step 604).

Next, the request response processing in this step 604 will be explained referring to FIG. 7. First, it is judged whether the request response is a request from the data evaluation section 111 or not (step 701). When the request response is a request from the data evaluating section 111, the latest image processing data and the latest obtained distance information data are read out' from DB 507, 508 and DB 509 (step 702). When the read-out data is an image processing data, the projective transformation processing is executed (step 703), end positional information is transformed onto a coordinate of an actual road. Further, the transformed information is corrected to a positional relation of the vehicle at a desired time (step 704). The processings up to from step 702 to step 704 are repeatedly executed by the number of times input processing was requested (step 705). Then, the corrected processing result is outputted to the data evaluating section 111 which is the source of the request (step 706).

When the judgment result of step 701 is not a request from the data evaluating section 1111, the requested data is read out from the corresponding DB (step 707). Projective transformation processing is executed (step 708) so that the data can be corrected into a positional coordinate at a desired time (step 709). Next, it is judged whether or not the request is made by an image processing means such as the road region extracting means 501 or the traffic lane dividing line extracting means 502 (step 710). When the request is from the image processing means, reverse projective transformation processing is executed (step 711), and the positional information is reversely projectively transformed into a positional coordinate in an image memory. Therefore, the processing load of the image forming means can be reduced. When the request is not from the image forming means, this reverse projective transformation processing is not executed. After that, the processing result is outputted to the requesting source which made the request (step 706).

Next, referring to the flow chart shown in FIG. 8 and the graph shown in FIG. 9, the processing to correct data in accordance with a positional relation of the vehicle at a desired time in step 704 and step 708, will be explained.

First, it is judged whether input time t1 at which relevant data such as image input time is inputted, is equal to time t2 or not (step 801). When time t1 is different from time t2, locus estimating data at time t1 is read out from locus estimation DB 510 (step 802). This locus estimating data is shown by a vector 901 in FIG. 9, which represents the position and direction of the vehicle in the absolute positional coordinate et time t1. Successively, locus estimation data at time t2 is read out from locus estimation DB 510 (step 803). This locus estimation data is represented by a vector 902 in FIG. 9, which shows the position and direction of the vehicle in an absolute positional coordinate at time t2. According to the locus estimation data at time t1 and t2, each point of corresponding data at time t1 is positionally corrected, and each point is corrected to a position on a relative coordinate at time t2 (step 804). Next, referring to FIG. 10, positional correction in step 804 will be explained. Positions of the vehicle at time t1 and t2 are shown by points 1002 (Xt1, Yt1), 1003 (Xt2, Yt2) on an absolute positional coordinate 1001 shown in FIG. 10(a). This absolute positional coordinate 1001 is represented by the X axis and Y axis. Point P (x1, y1) on a relative positional coordinate 1004 at time t1 is transformed into point P' (x2, y2) on a relative positional coordinate 1005 at time t2 which is shown in FIG.

10(b), by this positional correction. The relative positional coordinate 1004 at time t1 is shown by the x axis and y axis, and the relative positional coordinate 1005 at time t2 is shown by the x' axis and y' axis. Here, the directions of the x axis and x' axis of the relative positional coordinate at time t1, t2, show the directions of the vehicle at time t1, t2, and respectively formed angle $\theta 1$ and angle $\theta 2$ with the X axis of the absolute coordinate. Also transformation at the aforementioned positional correction is conducted according to the following equations.

$$\begin{bmatrix} \Delta x \\ \Delta y \end{bmatrix} = \begin{bmatrix} \cos\theta 1 \sin\theta 1 \\ -\sin\theta 1 \cos\theta 1 \end{bmatrix} \begin{bmatrix} X_{t2} - X_{t1} \\ Y_{t2} - Y_{t1} \end{bmatrix}$$

$$\begin{bmatrix} x2 \\ y2 \end{bmatrix} = \begin{bmatrix} \cos\Delta\theta \sin\Delta\theta \\ -\sin\Delta\theta \cos\Delta\theta \end{bmatrix} \begin{bmatrix} x1 - \Delta x \\ y1 - \Delta y \end{bmatrix}$$

where $\Delta\theta = \theta 2 - \theta 1$

In the manner described above, when three kinds of image processing results are integrally controlled and each road description data is corrected with regard to time and position, past image data is expressed in the form of image date on the desired present coordinate, which will be explained specifically, referring to FIG. 11.

FIG. 11 shows progress in time of each processing. FIG. 11(a) shows progress in time of region extracting processing in the road region extracting means 501. FIG. 11(b) shows progress in time of general line segment extracting processing in the traffic lane dividing line extracting means 502. FIG. 11(c) shows progress in time of local line segment tracing processing in the traffic lane dividing line extracting means 502. Each time axis is divided by a certain amount of time, and one section of time represents a period of time in which one processing is conducted. Assuming that a data request is made at the present time t4 shown by a dotted line, then each processing outputs the last time processing result which is the latest processing result. That is, the region extracting processing outputs the processing result of an image which was taken in at time t1, the general line segment extracting processing outputs the processing result of an image which was taken in at time t2, and the local line segment tracing processing outputs the processing result of an image which was taken in at time t3.

Figure 12A:
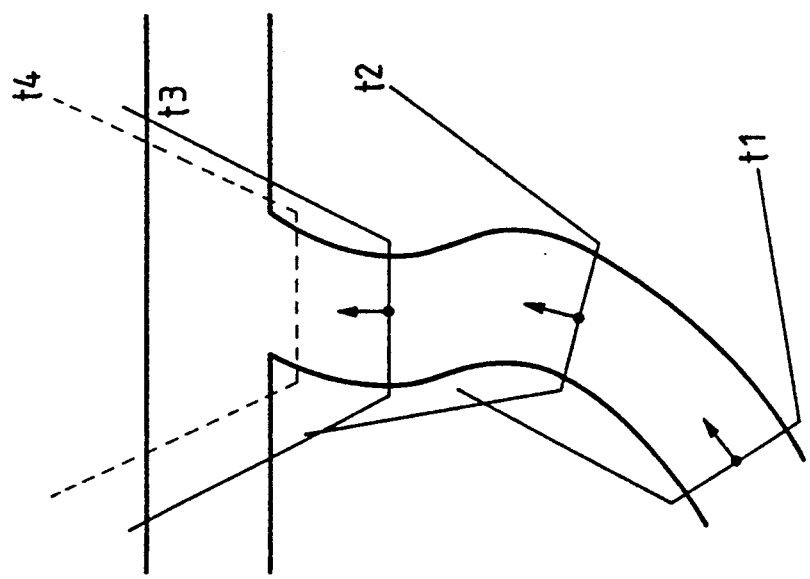
Figure 12B:
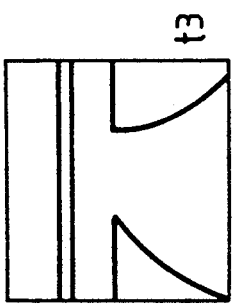
Figure 12C:
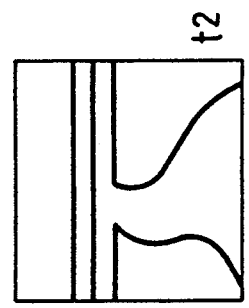
Figure 12D:
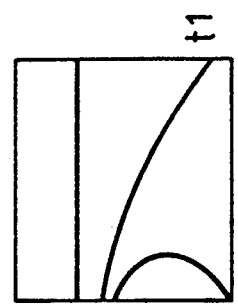

For example, in the case where the shape of a road is shown in FIG. 12(a), the image pickup range of the autonomously running vehicle varies et time t1-t4 as illustrated in the drawing. Therefore, images taken by a camera at time t1, t2 and t3 are as shown in FIG. 12(b), FIG. 12(c) and FIG. 12(d). The data control section 109 corrects the movement of the vehicle during the present time and each time by means of locus estimation in the manner described above, and expresses the data of the present time on the relative coordinate at the present time t4. As described above, when processing results between image processing algorithms are mutually utilized, various advantages can be obtained. For example, when the processing result of the general segment extraction is utilized, the local line segment tracing processing becomes easy. Also, when the extracted road edges are utilized, accuracy of region extracting processing can be improved. Furthermore, every image processing algorithm can utilize its own previously obtained processing result.

Next, the data evaluating section 111 will be explained. First, the outline is explained. Road data is very important for an autonomously running vehicle, because the more correct road data is, the more stably the system can run. In order to make it possible to drive a vehicle at a higher speed with a more flexible and stable system, the following technique is utilized in the data evaluating section 111. First, by utilizing a plurality of image processing results, an output can be generated in which mutual weak points of each processing are compensated. Secondly, each image processing result can be verified under a simple condition to find whether or not the image processing result is appropriate as road data.

Due to the aforementioned first technique, data evaluation can be conducted more flexibly on a diversely changing environment. That is, in the case of a road on which a white line is drawn, the image processing result best suited to white line extraction can be utilized, and in the case of a road on which a white line is not drawn, the result of color region processing can be utilized. When road data is evaluated by the second technique, more reliable road data can be made. The aforementioned second technique is similar to a conventional method of Kuan and Sharma (Kuan, D. and U. K Sharma). This method is shown in a document titled "Model Based Geometric Reasoning for Autonomous Road Following" (Proc. 1987 IEEE ICRA, pp.416-423 (1987)). However, the method according to this embodiment which can be applied to an ordinary road, is superior to that of Kuan and Sharma in view of the fact that the technique evaluates road data by dot and not by line segment, or region data and line segment data are matched with each other.

The flow of data processing in the data evaluating section 111 is shown in FIG. 13.

By the way, the data evaluating section 111 inspects first three kinds of the image processing results as described above and harmonizes the results inspected to form the road data. However, in order to achieve this function, it is possible to take an inspection processing and a mutual make-up processing in reverse order, that is, to have a processing flow where the three image processing results are harmonized first and the result of the harmonization is then inspected. However, processing in the reverse order was not adopted in the present embodiment for the following reasons. First, it is possible to evaluate which date is reliable by taking an inspection at first. Second, the amount of data to be processed is relatively small since the output data is made only based on the data inspected. Third, the harmonization is not always necessary. Fourth, it becomes possible to process in parallel what may be inspected independently for inspection of road data.

First, after projective transformation, three image processing results which have been corrected to the same desired time, are inputted from the data control section 109. Since the image processing results are transformed to the same time, the data can be easily compared, and since the image processing results are projectively transformed, a geometrical evaluation of road data can be easily conducted on the assumption that a road is plane. The data evaluating section 1301 determines whether or not the three image processing results are appropriate as road data. Under the following conditions and from these results, reliable road data is made to be outputted to the environmental description making section 112.

The conditions of appropriateness for road data are as follows. As for the road width condition, the road must have a certain road width, and as the smoothness condition, the road segment must be smooth. As for the abnormal point condition 1, the number of points of road data shall be not less than a certain value. As the abnormal point condition 2, road data shall not exist outside the measurement range. As the abnormal point condition 3, road data shall not exist outside the road region.

In order to verify appropriateness of road data, it is necessary to provide a road model which describes the road. A road model in this embodiment is made under the following conditions. That is, as <road width condition>, the road must have a road width, and as <smoothness condition>, the line segment composing the road must be smooth. Furthermore, <abnormal point condition 1> for removing abnormal data, shall have a number of points of road data not less than a certain value, as <abnormal point condition 2> road data shall not exist outside the measurement range and as <abnormal point condition 3> road data shall not exist outside the road region.

When observing only the aforementioned conditions, it will be found that the road model of this embodiment is simpler than the conventional road model of Kuan and Sharma (Document: "Model Based Geometric Reasoning for Autonomous Road Following", Proc. 1987 IEEE ICRA, pp. 416–423(1987)). That is, the road condition of this embodiment, does not include the condition of parallelism of road edges. This is because it is possible to estimate the parallelism by using only road width. Further, the condition of continuity of a road is not included. The reason is that continuity can be verified to a certain extent by the environmental describing section 112. Furthermore, the system of this embodiment is different from their system in a manner that three image processing results are utilized. Accordingly, in some cases, the results of present time data evaluation and the last time data evaluation are generated from an image processing entirely different result, therefore data evaluation results can not be simply compared.

Next, processing to verity appropriateness as road data by a road width condition will be explained.

The measurement of road width is different from the method by Kuan and Sharma in that the road width is calculated with an outer product et a level of point. Kuan and Sharma also use an outer product to measure a distance between an endpoint of a line segment and corresponding line segment so that the distance between line segments can be found by averaging end points. In this embodiment however, the outer product is used to measure distance between a point and corresponding line segment. Further, by measuring road widths of a plurality of line segments, the application of the method to a multi-traffic lane road is made possible. Measurement of a road width utilizing an outer product is conducted as follows.

Next, the environmental description making section 112 will be explained. When divided roughly, this module is composed of two portions. One is a portion which represents the environment surrounding an autonomously running vehicle in the form of an environmental description according to traffic lane dividing line data outputted from the data evaluating section and the position of an obstacle outputted from the radar system 103.

The other is a portion which controls the environmental description that has been made in the aforementioned manner. Here, the environmental description is an environmental map on which a traffic lane dividing line and an obstacle position are projected onto a ground surface coordinate, whereon the autonomously running vehicle is grasped et the origin. As compared with a method characterized in that autonomous running is conducted utilizing only the result of image processing, a method provided with an environmental description has the following advantages.

First, output from various sensor systems can be uniformly treated. Secondly, a portion (such as a corner) which can not be viewed by one image processing operation being in a dead angle of the camera, can be grasped by utilizing past data. Thirdly, when a module of the sensor system refers to an environmental description, reliability of the system can be improved.

In the environmental description of this embodiment, vector data is adopted as basic data, and the relation of combination and junction between data is represented with a bi-directional list. Since a plurality of environmental descriptions are made and held, when an access request is made by another module, not only does it suffice that the data of environmental description which has been already processed, is being referred but it is not necessary to wait for the completion of environmental description being processed at present, with additional advantage that, NOT- IF-THEN control is not necessary, so that access control becomes easy.

Next, the locus control section 116 will be explained. The control is conducted in a manner that with regard to the sequence of points of road sent from the external environment and making the target sequence of points, a planned smooth running locus is made considering the characteristic of vehicle body and the vehicle traces this planned locus. As the composition is shown in FIG. 14, the locus control section 116 is composed of a planned locus generating section 1401, a tracing section 1402 which traces this planned locus, and a steering angle control section 1403.

The sequence of points of road and the sequence of points of target are inputted into the planned locus generating section 1401 from the motion control supervisor 114, and the vehicles position, the absolute angle, and skid angle are inputted from the locus estimating section 115. With regard to the inputted road sequence of points and the target, sequence of points, the planned locus generating section 1401 generates a planned driving locus in which the vehicle body characteristic with regard to the present position and direction of the vehicle is considered with consideration to the position of the vehicle, the absolute angle and the skid angle. Sent from the locus estimating section 115. With regard to the generated planned locus, the present condition (such as a yew rate, vehicle speed and steering angle) of the vehicle is fed back to the planned locus generating section 1401, and the present steering angle is generated so that the locus can follow the planned locus. The steering angle section 1403 conducts steering angle position control with regard to a directed steering angle.

Next, the vehicle speed control section 117 will be explained. The composition of the vehicle speed control section 117 is shown in FIG. 15. The vehicle speed control section 117 is composed of a vehicle speed plan generating section 1501, a target vehicle speed tracing section 1502, and an actuator control section 1503.

A sequence of points of target route speed (target distance $X_{ref} Y_{ref}$, target speed $V_{ref}$) is inputted into the vehicle speed plan generating section 1501 from the motion control supervisor 114, and actual distance $X_{act}$ and actual speed $V_{act}$ are inputted into the vehicle speed plan generating section 1501 from a vehicle body 1504 of the autonomous driving vehicle. Then, a target vehicle speed changing pattern which satisfies the target, is generated from each given data by means of a fuzzy inference. The target vehicle speed tracing section 1502 outputs a target throttle opening and a target brake pressure so that the vehicle speed can follow target speed $V_{ref}$ outputted from the vehicle speed plan generating section 1501. Calculation of this opening and pressure is conducted in such a manner that: actual speed $V_{act}$ and actual acceleration $O_{act}$ are detected; and calculation is conducted on the basis of the aforementioned quantity of state of the vehicle body by means of a fuzzy inference. An actuator control section 1503 controls a throttle motor 1505 and a brake solenoid valve 1506 so that the throttle opening can agree with the target, throttle opening outputted from the target vehicle speed tracing section 1502 and the pressure can agree with the target brake pressure. Due to the aforementioned control, driving of the vehicle body 1504 can be controlled and the autonomous running vehicle is driven automatically.

As explained above, according to the present invention, data inputted and stored in the past is corrected to a desired time so that it can be evaluated. Consequently, image data which was inputted into a plurality of image pickup units and obtained after different processing times, or data obtained by the outside information obtaining means to obtain data other than image data, can be integrally judged at the same time.

Therefore, even when running control is conducted while the body is moving, a plurality of image information and each data obtained from a plurality of sensors can be corrected to the data of a desired time and position. The above provides a technique to integrally evaluate and process the data obtained at a different time and position. According to the aforementioned technique, movement control of an autonomously moving body can be conducted more accurately and stably.

Next, an evaluation method conducted in the aforementioned data evaluation section 111 will be described in detail.

In order to evaluate data effectively, in the data evaluating section 111, data in the form shown in FIG. 16 is used as the data of each inputted image processing result. As described above, in the data control 109, all the data is projectively transformed, and all of the three image processing results are corrected to the same time. Also in FIG. 16, only the input data structure by region extraction processing is shown among three data input structures, and structures of the other two processings can be represented in the same manner. That is, the data structures inputted from the region extraction processing, local line segment tracing processing, and general line segment extracting processing are commonly defined.

Inputted data are grouped according to the connecting condition of each line segment. The maximum number of groups is 16 (group 0-group 15). The maximum number of sequences of points composing the group is limited to 30. A line attribute is given to each segment. A coordinate (x, y) is assigned to the point which composes each line segment, and an attribute is given to each point. Sequences of points which are in an opposing relation with each other are grouped, and the groups are identified by the identification marks ID0, ID1, . . . This opposing relation is defined as a relation in which segments are opposed with each other. However, even when there is no information of this opposing relation, the opposing relation can be identified when data evaluation is conducted on all sequences of points. That is, the opposing relation is utilized here to reduce the search region when data is evaluated.

The number of connecting points between groups is found with regard to the groups which are in an opposing relation. The maximum number of the connecting points is limited to 5. The maximum number of groups which are in a connecting relation is also limited to 5. The connecting points found are given identification numbers ID0, ID1, . . . Here, the connecting relation indicates a connecting relation of one segment group with other different segment groups.

Data structure inside the data evaluating section 111 is also commonly defined with regard to the data obtained by local line segment tracing processing, general segment line extracting processing, and region extracting processing. Next, referring to an outline view of FIG. 17, the data structure inside the data evaluating section will be explain, taking as an example the data structure of general line segment extracting processing, each data is represented in a manner that the data is hierarchically fractionalized into groups, lines and points, and connected with each other by a pointer for the convenience of reference. Also in this data structure, a variable which has a name of flag such as road width flag, includes a verification result obtained by data evaluation. When this flag is referred to, the most appropriate evaluation data can be ultimately produced.

With regard to the data obtained by general segment extracting processing, the number of groups in a connecting relation, data input time, and reject flag are first defined. This reject flag indicates whether input data is appropriate or not, after being processed by general line segment extracting processing. Input data are divided into groups g[0] . . . g[1] . . . g[MAX_G-1], Wp to MAX_G. With regard to each group, the identification number ID, number of sequences of points, number of segments, attribute of a line segment, number of opposed groups, pointer to an opposed group, number of adjacent groups, road edge flag, and region flag are defined.

Further, the points of each group are divided into p[0] . . . p[j] . . . p[MAX_L] and maximum up to MAX_L+1. With regard to each of these points, identification number ID, attribute of a point, x coordinate, y coordinate, road width, road width flag, horizontal line flag, cross flag, outside region flag, duplication flag, number of belonging groups, and pointer to the belonging groups are defined.

The line of each group is divided into l (O) . . . l [k] . . . l (MAX_L−1) and maximum up to MAX_L. With regard to each line, the identification number, starting point, ending point, number of next line segment, and length of line segment are defined. Further, each line segment is provided with next line segment NextLine [O] . . . NextLine[m] . . . NextLine[MAX N−1] and maximum up to of MAX_N. With regard to each next line segment, a pointer to the next line segment and an angle with the next line segment are defined.

Next, the verification of appropriateness to verify whether or not data outputted from the data control section 109 is appropriate for road data, is explained.

In FIG. 18, X and Y represent a vector, and respective starting point coordinates are (x0, y0). The end point coordinates of vector X (X, Y) are coordinates of point P, and the end point coordinates of vector Y are (x1, y2). These vectors X, Y are expressed by the following equations.

$$x = (X - x0, Y - y0)$$

$$Y = (X1 - x0, y1 - y0)$$

Also in the drawing, $\theta$ is an angle formed by vector X and vector Y, and $X \times Y$ indicates respective outer products. At this time, distance vector d of straight line L formed by point P and vector Y, can be expressed by the following equation.

$$d = (X \times Y)/|Y|$$

Since $d = |x| \sin \theta$, d is positive when $\theta$ is 0°–180°, and negative when $\theta$ is 180°–360°. Therefore, the positional relation between point P and straight line L can be found by the sign of d.

Utilizing the outer product, when road width information is found with regard to the data shown in FIG. 19, the results are as shown in the following table. Unit of values in the table is cm. The distance between a point and a line segment opposed to the point on the right side, is shown in the upper column of Table 1. In the case where the point is located on the left boundary of the region and there is no line segment on the left side, the distance between the point and line segment opposed on the right side which is further opposed on the right side, is shown in the lower column of the table. The upper column of Table 2 shows the distance between a point "and a line segment opposed to the point on the right side, and the lower column shows the distance between a point and line segment opposed to the point on the left side. The upper column of Table 3 shows the distance between a point and a line segment opposed to the point on the left side. In the case where the point is located on the right boundary of the region and there is no line segment on the right side, the distance between the point and a line segment opposed on the left side which is further opposed on the left side, is shown in the lower column of the table.

TABLE 1

| Point | p00 | p01 | p02 | p03 | p04 |
|---|---|---|---|---|---|
| Distance between a point and a line segment opposed on the right side | −300 | −200 | −550 | −300 | −300 |
| Distance between a point and a line segment opposed on the left side | −600 | −600 | −700 | −600 | −600 |

TABLE 2

| Point | p10 | p11 | p12 | p13 | p14 |
|---|---|---|---|---|---|
| Distance to a line segment opposed on the right side | 300 | 300 | 200 | 400 | 300 |
| Distance between a point and a line segment opposed on the left side | −300 | −300 | −400 | −300 | −300 |

TABLE 3

| Point | p20 | p21 | p22 | p23 |
|---|---|---|---|---|
| Distance to a line segment opposed on the right side | 300 | 350 | 300 | 300 |
| Distance between a point and a line segment opposed on the left side | 600 | 600 | 600 | 600 |

The reason why the distance to a line segment which is further opposed to a line segment opposed to the point shown in Table 1 and Table 3 is that there is no relation of opposed line segments in the sequence of both encl points data in the example of road data shown in FIG. 19. In the case where the relation of opposed line segment properly exists, the distance shown in the lower column is not calculated with regard to points p0*, p2* (mark * stands for an arbitrary number) in Table 1 and Table 3. Also when the road width is verified, the minimum road width found is utilized with regard to each points excluding abnormal point. When the road width is not less than 300 cm and not more than 400 cm, the minimum road widths in each table above which are outside the aforementioned range are point p01, p02, p12. Line segments in which these three points are not included satisfy parallelism because vectors which are approximately the same as the outer product distances remain. The following simple proposition proves that parallelism can be satisfied by an outer product distance.

Proposition

The necessary and sufficient condition for a line segment 1 to be parallel with another line segment m and to have a distance D from the line segment m, is as follows:
d = an outer product distance between the start point of line segment 1 and line segment m = an outer product distance between the end point of line segment 1 and line segment m and $||d|| = D$.

Proof

Suppose that the start point of line segment 1 is p, the end point is q, the start point of line segment m is r, and the end point is s. When vector $Y = s - r$, vector $X1 = q - r$, and vector $X2 = p - r$, the following relation is established with regard to an arbitrary line segment 1.

Outer product distance between the start point of line segment 1 and line segment m = Outer product distance between the end point of line segment 1 and line segment m $$(X1 \times Y)/||Y|| = (X2 \times Y)/||Y||$$

$$(x1 \times Y)/||Y|| = [(X2 \times kY) \times Y]/||Y||$$

where k is a constant and vector Y is not a 0 vector, therefore the following equation is established.

$$X1 = X2 + kY$$

Consequently, line segment 1 and line segment m are in parallel with each other. Also, a norm of the outer product distance is equal to the distance between the two line segments (end of the proof).

Next, a processing will be explained in which appropriateness as road data is verified by verifying smoothness of data. This processing is based on a condition that an angle formed by vectors which are adjacent to each other is not more than a certain value when a road is smoothly continuous. However, when a result of image processing has become stabilized, this processing may not be necessary.

Next, a processing will be explained by which abnormal data is removed from road data.

Sometimes, an abnormal result is outputted from image processing. For example, when only plane objects are aimed and projectively transformed, if a solid object is extracted and projectively transformed, the solid object is outputted in the form of an abnormally far away point. Further, a processing which extracts a road composing line segment from monochromatic image may mistakenly extract a line segment outside a road region. In order to remove such abnormal data, the following is carried out in the data evaluating section 111.

(1) Data with few points of road data is not utilized.
(2) Points which are too distant, are not utilized.
(3) With regard to the result of monochromatic processing, points outside a road region found by a color region processing, are not utilized.

In the cases of (1) and (2), it suffices to only establish a flag at an abnormal point by an inequality processing using the number of points and the farthest point coordinate as discriminate line. The aforementioned (3) will be explained in a verification processing of consistency of region data with line segment extracting data.

The outline of this consistency verification processing is as follows. In the case of line segment extracting processing by monochromatic processing, extraction of a line segment which appears to form a road is conducted according to a monochromatic image, however a line segment outside the road region is often extracted from said processing. Therefore, in the data evaluating section 111, a line segment outside the road region is removed utilizing a road region obtained by region extracting processing. In order to realize this function, the data evaluating section 111 has adopted a technique in which region judgment is conducted by measuring distance utilizing the above described outer product. In this technique, for each point of line segment data, the distance to each line segment of region data is calculated by outer product, to judge by the calculated value whether the point is inside or outside the region.

In order to add information of a region to region data, region data is expressed by a vector. This vector is such that the region is expressed by the vector which always views the road region on the right side. For example, referring to FIG. 20 in which a road region is expressed by a hatched portion, the vector will be explained. That is, to judge whether each point is inside the region or outside, the vector expression is utilized. In FIG. 20, points p and q are investigated. The distance between the point and the line segment of region data, that is, the distance to boundary of the road region is found by calculating an outer product with regard to the two points. This outer product is calculated with regard to the boundary vector and the vector which is directed to points p, q from the start point of the boundary vector. When the minimum value is checked, the value of point p is negative, and that of point q is positive. The sign of outer product distance is defined as follows: the upper direction with regard to the drawing is defined as positive; and the lower direction is defined as negative. Therefore, the point p which outer product is negative, is judged outside the region, end point q which outer product is positive, to be inside the region.

As described above, each point can be classified into outside or inside of the region according to the vector of region data. This technique is characterized in that: judgment can be flexibly conducted to determine whether a point is inside or outside the region. That is, judgment can be conducted using a norm like distance and not by a two digit value of inside or outside. This technique is useful to render it significant when treating an object relating to both inside and outside of a region with regard to a point.

Next, processing to produce output road data will be explained.

When one piece of road data is made utilizing a result of verification conducted on road data which has been obtained from three image processings, the output rule was set as shown in Table 4, based on the following three basic concepts.

The basic concepts are as follows.
(1) Data judged to be appropriate as a result of verification, is outputted without processing as far as possible.
(2) When there is a plurality of appropriate results, output data is determined according to priority.
(3) In case there is no appropriate data, integrated data is made from a plurality of data and outputted.

TABLE 4

| | Result of check on appropriateness | | | | | | | |
|---|---|---|---|---|---|---|---|---|
| Reigion extracting processing | Normal | Normal | Normal | Normal | Abnormal | Abnormal | Abnormal | Abnormal |
| Local line segment tracing processing | Normal | Normal | Abnormal | Abnormal | Normal | Normal | Abnormal | Abnormal |
| General line segment extracting processing | Normal | Abnormal | Normal | Abnormal | Normal | Abnormal | Normal | Abnormal |
| Output Data | Local line segment tracing processing | Local line segment tracing processing | Region extracting processing | Region extracting processing | Local line segment tracing procerssing | Local line segment tracing processing | General line segment tracing processing or integrated data | Integrated data |

The reasons behind those concepts are as follows:

Concept (1) is set for obtaining the real time property. That is, if data is appropriate, it is sufficient for driving without going through processing. The system requires output road data as quickly as possible, therefore it is effective to output the data as it is.

Concerning concept (2), it is due to the difference in the characteristic of data. At present, the region extracting processing, which is one of the three image processings, does not output data except for road edge data. Also, because the general line segment extracting processing is a general processing it can not be applied to a complicated road in that condition.

Accordingly, when a recognized road structure is monotonous, the general line segment extracting processing is useful, and if the result of verification of data sent from the general line segment extracting processing is appropriate, then the data is outputted. The judgement of whether the road structure is monotonous or not is estimated from the data sent from the general line segment extracting processing.

At present, a situation wherein the result of the local line segment tracing processing is appropriate;
 the number of groups of the general line segment extracting processing <7; and
 the angle formed with a next line segment <30 has been repeated continuously more than three times, the road structure is defined to be monotonous.

On the other hand, when a recognized road structure is complicated, the priority is determined in such a manner that: local line segment tracing processing > region extracting processing > general line segment extracting processing (wherein sign > represents that the left side processing has a higher priority) and when a plurality of data is appropriate, output data is determined according to this order.

Concerning basic concept (3), when data is individually not appropriate as road data, different kinds of data are integrated so that the defects can be compensated. Different kinds of data within a point have been judged to be appropriate by an evaluation, and these appropriate points are integrated. Detail of this integration is described as follows.

Table 4 is viewed as follows. When the result of the check on appropriateness of data obtained by the region extracting processing is normal and when the result of the check on appropriateness of data by the local line segment tracing processing is also normal, the data according to the local line segment tracing processing is outputted from the data evaluating section 111. The result of checks on the appropriateness of other rows can be similarly read out from Table 4.

Next, integration processing of different kinds of data will be explained. When all the results of data verification are abnormal, one piece of data is made by integrating a plurality of data into a point which has been determined to be appropriate in the verification. The main flow of integration processing of different kinds of data is as follows. First, concerning the data obtained after three image inputs have been verified, the data which has the most numerous appropriate points is defined as primary data, and the data which has the second numerous appropriate data is defined as auxiliary data. Secondly, concerning each line segment group of primary data, a point which can be integrated into auxiliary data is found and integrated.

Whether a line segment can be integrated or not is determined by whether or not a point in auxiliary data is smoothly connected to a line of primary data. The judgment of whether the point in auxiliary data is smoothly connected or not, is determined by an angle formed by an extended line segment and a line segment on this side. For example, in FIG. 21, point P is smoothly connected to straight line L means that angle q formed by a line segment 2101 connecting an endpoint of straight line L with point P and an extended line of straight line L is not more than a certain value. In the case of the autonomously running vehicle in this embodiment, cos q >0.8. According to this reference, only point PI is integrated in the case of data shown in FIG. 22. That is, an angle formed by a line segment connecting the endpoint of an existing line segment with point P2 and an extended line of the existing line segment is more than a reference value. On the other hand, an angle formed by a line segment based on point PI and the existing line segment is in a range of a reference value. As a result, point P is integrated with the existing line segment, so that a smoothly connected straight line shown in FIG. 23 can be obtained.

Next, a data evaluating algorithm in the data evaluating section 111 will be explained.

A main flow chart of data evaluation processing is shown in FIG. 24. First, initialization processing is conducted (step 2401). Then, three image processing results are read in (step 2402). The three image processing results are transformed into an internal data structure so that the processing results can be easily treated in the process of data evaluation (2403). Thereafter, appropriateness as road data is checked for each image processing result independently (step 2404). At that time, whether the data is appropriate or not is verified by the method described above at each point, and data which has too many inappropriate points, is judged to be abnormal. According to the result of this verification of appropriateness, a determination as to whether or not all data is abnormal is made. In case all data is abnormal, an appropriate point is found in all data (even when data is abnormal, some points composing the data are appropriate), and data is integrated according to the appropriate point which was found (step 2406), to be outputted as one road data (step 2407).

When even one piece of appropriate data exists in the judgment of step 2405, it is subsequently judged whether or not general line segment extracting processing is normal and the road is monotonous (step 2408). At this time, the same reference as that of output road data making processing is utilized. When it has been realized that general line segment extracting processing is normal and the road is monotonous, the result of general line segment extracting processing is outputted (step 2409). If not, appropriate data is outputted according to priority (step 2410). The priority is determined in such a manner that: the first priority is given to the data according to local line segment tracing processing; the second priority is given to the data according to region extracting processing; and the third priority is given to the data according to general line segment extracting processing.

A simple example will be explained as follows. An example a case wherein the input data is as shown in FIG. 25, FIG. 25(a) represents input data from local line segment tracing processing, FIG. 25(b) represents input data from general line segment extracting processing, and FIG. 25(c) represents input data from region extracting processing. First, appropriateness as a road of each data is evaluated. As a result, input data from local line segment tracing processing, which is shown in FIG. 25(a), is determined to be abnormal since points 1 p3 and 1 p6 are abnormal judging from the reference of road width. Input data from general line segment extracting processing, which is shown in FIG. 25(b), is determined to be abnormal since points gp0 and gp1 are outside the road region and data itself becomes abnormal. Input data from region extracting processing, which is shown in FIG. 25(c), is determined to be abnormal since points cp5 and cp6 are abnormal judging from the reference of road width and evaluation results of the region extracting processing.

As described above, because all data are judged to be abnormal, integration of data is conducted according to Table 4. FIG. 26 shows the points which have been determined to be appropriate after the verification of appropriateness of each data. That is, appropriate points in the input data of local line segment tracing processing, general line segment extracting processing, and region extracting processing, which are shown in FIG. 25(a), (b) and (c), are shown corresponding to FIG. 26(a), (b) and (c). As described above, several points which seem to be appropriate remain in the data which has been judged to be abnormal, therefore these points are utilized. In FIG. 26, the input data from local line segment tracing processing has the most numerous appropriate points, and the input data from region extracting processing has the second most numerous appropriate points. Therefore, the input data from local line segment tracing processing is selected for primary date, and the input data from region extracting processing is selected for auxiliary data. The primary and auxiliary data are integrated with reference to smoothness, and one road data shown in FIG. 27 becomes the result of output.

Next, an experimental result according to this embodiment will be explained.

Experimental examples are shown in FIGS. 28-33. The experiment was conducted on a SUN4/110 Work Station made by Sun Micro Systems Co. in USA and 68020CPU Board MUME 133XT made by Motorola Co. in USA. The language used was C-language, and the processing time was 20-100 msec in the case of SUN4/110, and 40-300 msec in the case of 133XT. Characters (a), (b) and (c) in each drawing represent inputted data from local line segment tracing processing (local Hough-Transformation processing), inputted data from general line segment extracting processing (general Hough-Transformation processing), and inputted data from region extracting processing (color region processing). Characters (d), (e) and (f) in each drawing represent evaluation data results concerning inputted data from local line segment tracing processing, evaluation result data about inputted data from general line segment extracting processing, and evaluation result data about inputted data from region extracting processing. Characters (g) and (h) in each drawing represent primary data and auxiliary data, and character (i) in each drawing represents output data.

Figure 28:
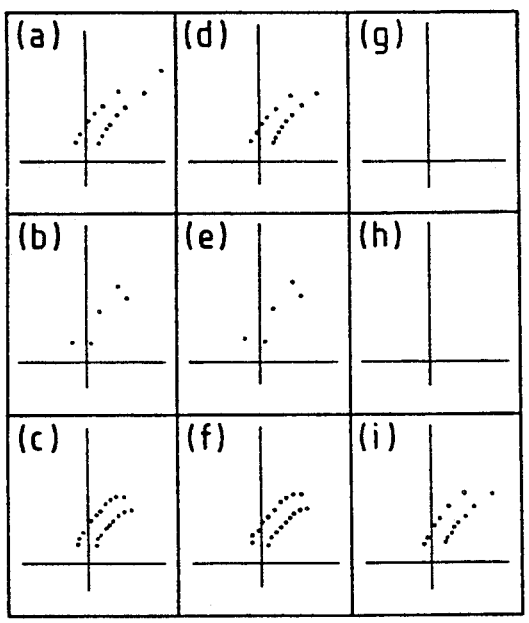

FIG. 28 shows an example in which the aforementioned three road boundary extracting processings are conducted on a curved road. Each input data shown by (a), (b), (c) in FIG. 28 is evaluated in the data evaluating section 111. The results of the evaluation are shown by (d), (e), (f) in FIG. 28, which seem to be correct. Therefore, all of the three input images are judged to be correct, and according to the priority described above, evaluation data obtained by local line segment tracing processing, that is, the data shown in FIG. 28(d) is outputted, and the outputted results become those as shown in FIG. 28(i).

Figure 29:
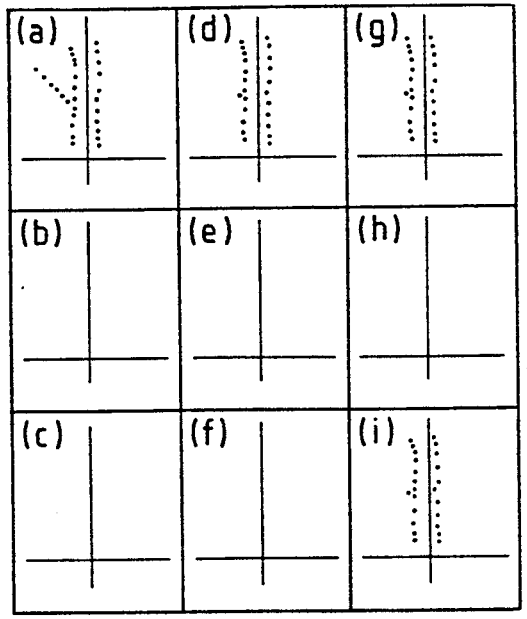
Figure 30:
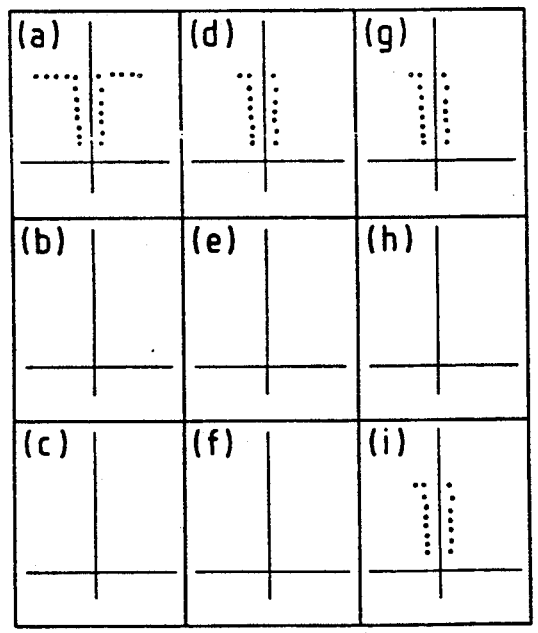
Figure 31:
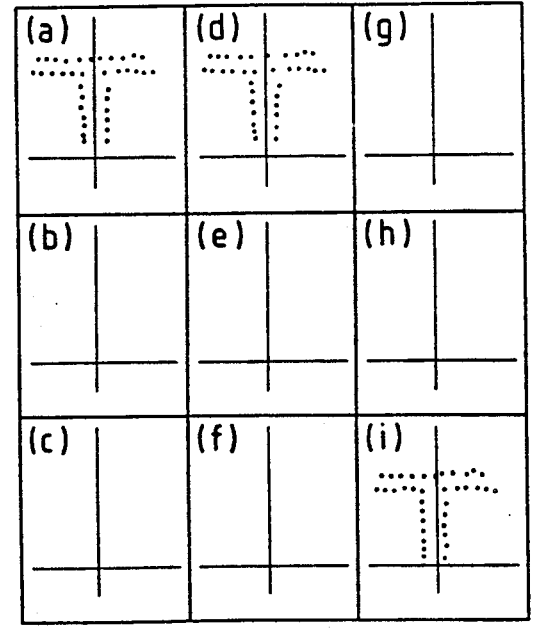

FIGS. 29-31 show examples in which only data obtained by local line segment tracing processing shown by (a) in each drawing, is inputted.

FIG. 29 shows an example in which a redundant line is extracted due to a failure in tracing processing. A redundant line which exists in FIG. 29(a) diagonally to the left, is removed by data evaluation as shown in FIG. 29(d). This input data has numerous inappropriate points so that it has been judged to be not appropriate as road data. However, in the case shown in this drawing, other input data does not exist, therefore road data consisting only of points evaluated as appropriate, that is, evaluation data which is shown in FIG. 29(d) becomes primary data shown in FIG. 29(g), eventually becoming the output date shown in FIG. 29(i).

FIG. 30 and FIG. 31 both show the results of local line segment tracing processing of a T-shaped road. In FIG. 30, the far off boundary of the T-shaped road is not extracted, however, in FIG. 31, the far off boundary is extracted. That is, in FIG. 30, a line segment corresponding to an end of a boundary of the T-shaped road in the data shown in FIG. 30(a) can not be found. Therefore, the points after the corner at the end of the T-shaped road are processed has being inappropriate, to become the data evaluation result as shown in FIG. 30(d). Inappropriate points are so numerous that data integration processing is being conducted. However, the only available data is the data of local line segment tracing processing, therefore the evaluation data shown in FIG. 30(d) becomes the primary data shown in FIG. 30(g), to become the output data shown in FIG. 30(i) in that condition.

Also, in FIG. 31, all points of the T-shaped road are extracted, therefore all points are evaluated to be appropriate, and evaluation data shown in FIG. 31(d) is obtained, to become output data shown in FIG. 31(i). As explained above, this processing is of a bottom-up type, not utilizing any data other than results of image processing, therefore this processing can not predict the structure of a road. However, if the existence of a T-shaped road can be predicted, by utilizing a navigation system and the like, the result of FIG. 30 naturally will be different. That is, one end of the T-shaped road can be predicted and correct road data can be obtained.

Figure 32:
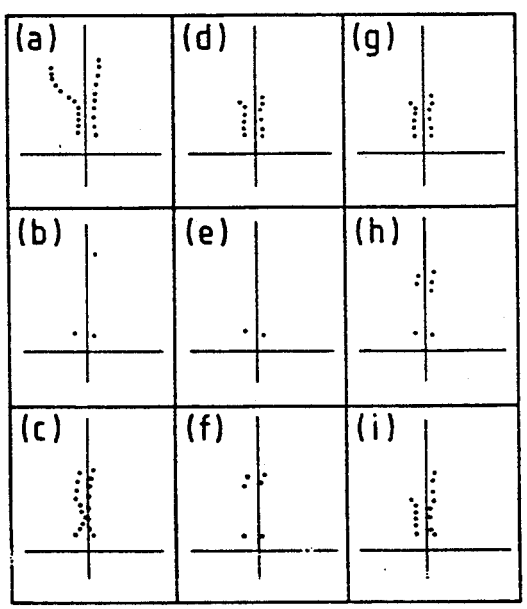

FIG. 32 is an example which depicts the function of road structure verification by road width and the function of integration of different kinds of data. Points of input data shown in FIG. 32(a) sent from local line segment tracing processing are judged not to be appropriate since the far end of the road is widened. Therefore, these points are removed by means of data evaluation, to obtain evaluation data shown in FIG. 32(d). Also, points of input data shown in FIG. 32(b) sent from general line segment extracting processing are judged not appropriate since the road width of the far side is narrow, to obtain evaluation data shown in FIG. 32(e). Further, concerning input data shown in FIG. 32(c) sent from region extracting processing, the points in the middle distance are judged not appropriate since the road width of the middle distance is narrow, to obtain evaluation data shown in FIG. 32(f).

As described above, all input data includes a large amount of abnormal data, therefore data output is conducted by producing integrated data. At that time, the primary data for integration is the evaluation result data of local line segment tracing processing shown in FIG. 32(g). Auxiliary data shown in FIG. 32(h) is a group of appropriate points within input data sent from region extracting processing. By integration of data the sequence of points on the right side of the road with regard to primary data is integrated, and data shown in FIG. 32(i) is outputted. At that time, the reason why the sequence of points on the left side of the road is not integrated, is because a far end point on the left side of the road with regard to primary data is somewhat widened, and not being connected smoothly with auxiliary data.

Figure 33:
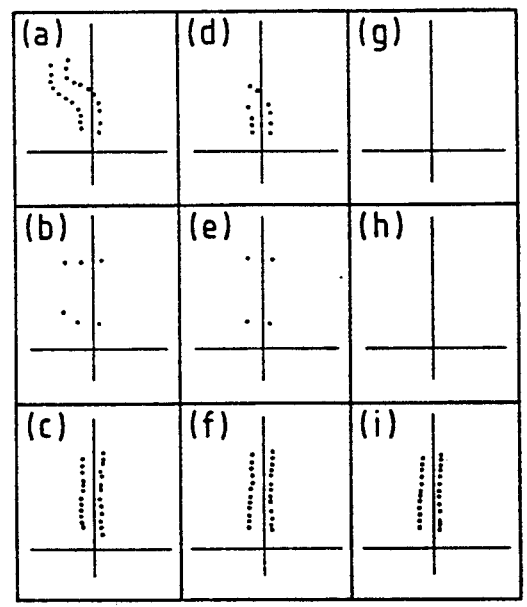

FIG. 33 is an example which clearly shows the verification of consistency between input data sent from region extracting processing and line segment extracting data obtained by small region tracing processing. Evaluation data shown in FIG. 33(f) can be obtained from input data sent from region extracting processing shown in FIG. 33(c). With regard to input data from two small region tracing processings shown in FIG. 33(a) and FIG. 33(b), the points outside the road expressed in evaluation data of region extracting processing are judged abnormal. Therefore, with regard to each line segment extracting data obtained by small region tracing processing, the points outside the road processed by region extracting processing are removed, to become evaluation data shown in FIG. 33(d) and FIG. 33(e). Since input data inputted from region extracting processing does not include an abnormal point, the data is judged appropriate as road data, and outputted in the form of data shown in FIG. 33(i).

As described above, in this embodiment, a plurality of road data which have been corrected to the same time are inputted, and each road date is verified according to the road model expressed at a point level, and then one road data is made according to a plurality of road data obtained after verification.

Since a plurality of image processing results are inputted in the manner described above, data which most look like a road can be obtained therefrom as output. Consequently, weak points of each image processing can be compensated as compared with a conventional case in which a single image processing result is utilized. According to the conventional road recognition method by Kuan and Sharma, a road is recognized in such a manner that: the road is verified by a road model which is expressed by line segments; and because too much weight is given to parallelism of the road model, a complicated road shape such as a branched road or multi-traffic lane road could not be verified. However, when verification is conducted at a point level as shown in this embodiment, parallel line segments inside the road are obtained, as a result, so that the road recognition can be also conducted on a branched or multi-traffic lane road.

As explained above, according to the present invention, data evaluation is conducted not on a line segment level but on a point level, so that a road having a complicated shape can be recognized. Therefore, a road closer to reality having a branched portion, etc. can be recognized whereas only a monotonous road having one traffic lane is recognized by a conventional method. Likeness to a selected road is judged by the sequence of points data outputted from a plurality of road boundary extracting processings, so that the reliability of obtained data is improved. Therefore, stable road data can be obtained.

As a result, according to the present invention, an autonomously running vehicle can be automatically driven in a condition similar to a real driving condition.

From the invention thus described, it will be obvious that the invention may be varied in many ways. Such variations are not to be regarded as a departure from the spirit and scope of the invention, and all such modifications as would be obvious to one skilled in the art are intended to be included within the scope of the following claims.

We claim:
1. A control system for an autonomously moving body comprising:
   a plurality of data accumulation and processing means for generating a plurality of data sets descriptive of a travel area in a direction of movement of said autonomously moving body;
   data control means coupled to said plurality of data accumulation and processing means, said data control means including at least one data base for storing said data sets descriptive of said travel area and including means for transforming and synchronizing said data sets such that said data sets represent said travel area and a position of said autonomously moving body at a selected moment in time;
   data evaluation means coupled to said data control means for integrating said transformed data sets into a single data set descriptive of said travel area and verifying that said data sets include data descriptive of a travel path along which said autonomously moving body is travelling; and
   motion control means coupled to said data evaluation means for controlling the motion of said autonomously moving body such that said autonomously moving body is capable of moving along said travel path.

2. The control system of claim 1 wherein said plurality of data accumulation and processing means comprise:
   at least one video camera for generating image data descriptive of said travel area in said direction of travel of said autonomously moving body;
   region extracting means for extracting data representative of a road from said image data descriptive of said travel area, said road having at least one edge;
   general line segment extraction means for extracting from said image data general line data representing said at least one edge of said road;
   local line segment tracing means for extracting from said image data local line segments representative of said at least one edge of said road; and
   a radar system for generating location data corresponding to obstacles disposed within said travel area.

3. The control system of claim 2 further comprising environmental description means for providing environmental map data descriptive of a position of said autonomous moving body within said travel area, said environmental description means being coupled to said data evaluation means and said motion control means and including an environmental description data base.

4. The control system of claim 3 further comprising a navigation system coupled to a user interface and to said environmental description means, said user interface providing a means for entering control data into said control system, and said navigation means in response to data input via said user interface providing a general route description to said environmental description means.

5. A control system for an autonomously running body comprising:

at least one color video camera and at least one monochromatic video camera for generating image data descriptive of a travel area in a direction of travel of said autonomously moving body;

region extracting means for extracting data representative of a road from said image data descriptive of said travel area, said road having at least one edge;

general line segment extraction means for extracting from said image data general line data representing said at least one edge of said road;

local line segment tracing means for extracting from said image data local line segments representative of said at least one edge of said road;

a radar system for generating location data corresponding to obstacles disposed within said travel area;

data control means coupled to said region extraction means, said general line segment extraction means, said local line segment extraction means, and said radar system, said data control means including at least one control data base for storing said data generated by said radar system and for storing said data extracted by said region extraction means, said general line segment extraction means, and said local line segment extraction means; said data control means including means for transforming and synchronizing said data stored in said at least one control data base such that said data stored in said at least one control data base represents said travel area and a position of said autonomously moving body at a selected moment in time;

data evaluation means coupled to said data control means for integrating said transformed data into a single data set descriptive of said travel area and verifying that said single data set includes data descriptive of a travel path along which said autonomously moving body is travelling;

environmental description means for providing environmental map data descriptive of a position of said autonomous moving body within said travel area, said environmental description means being coupled to said data evaluation means and said motion control means and including an environmental description data base; and motion control means coupled to said data evaluation means for controlling the motion of said autonomously moving body such that said autonomously moving body is capable of moving along said travel path.

* * * * *